United States Patent [19]
Mullet et al.

[11] Patent Number: 6,019,269
[45] Date of Patent: Feb. 1, 2000

[54] CONVEYOR APPARATUS FOR THE TRANSPORT OF DOOR PANELS

[75] Inventors: Willis J. Mullet, Pensacola Beach; Albert W. Mitchell, Pace, both of Fla.; Thomas B. Bennett, III, Wooster, Ohio

[73] Assignee: Wayne-Dalton Corp., Mt. Hope, Ohio

[21] Appl. No.: 09/169,504

[22] Filed: Oct. 9, 1998

Related U.S. Application Data

[60] Division of application No. 08/380,084, Jan. 30, 1995, Pat. No. 5,836,499, which is a continuation-in-part of application No. 08/260,108, Jun. 15, 1994.

[51] Int. Cl.⁷ .............................. B65H 20/00; A01J 21/00
[52] U.S. Cl. .......................... 226/172; 264/321; 425/193; 425/371; 425/DIG. 5
[58] Field of Search ..................................... 226/171, 172, 226/173, 174; 264/321; 425/193, 371, 335, DIG. 5; 198/626.3, 626.4, 626.5, 626.6, 803.11, 473.1

[56] References Cited

U.S. PATENT DOCUMENTS

| | | | |
|---|---|---|---|
| 1,530,762 | 3/1925 | Dautrick | 160/191 |
| 1,621,669 | 3/1927 | Johnson | 160/191 |
| 1,626,844 | 5/1927 | Kuhn | 160/229.1 |
| 1,724,995 | 8/1929 | Dautrick | 160/191 |
| 1,750,042 | 3/1930 | Hoover | 160/190 |
| 1,827,433 | 10/1931 | Kendall | 160/189 |
| 1,888,162 | 11/1932 | Eklund | 160/201 |
| 1,955,644 | 4/1934 | Lowe et al. | 16/355 |
| 1,990,870 | 2/1935 | Kelly | 160/194 |
| 1,994,142 | 3/1935 | Madsen | 160/190 |
| 2,017,012 | 10/1935 | Morgan | 160/190 |
| 2,059,833 | 11/1936 | Winn, Jr. | 160/9 |
| 2,093,019 | 9/1937 | Norberb | 160/191 |
| 2,099,191 | 11/1937 | Blodgett | 160/189 |
| 2,166,746 | 7/1939 | Bartel | 160/191 |
| 2,281,860 | 5/1942 | Renault | 425/371 X |
| 2,557,716 | 6/1951 | Allee | 16/250 |
| 2,641,792 | 6/1953 | Peeler | 16/250 |

(List continued on next page.)

FOREIGN PATENT DOCUMENTS

| | | |
|---|---|---|
| 0 438 046 B1 | 10/1993 | European Pat. Off. |
| 0 370 324 B1 | 3/1994 | European Pat. Off. |
| 0 370 376 B1 | 7/1994 | European Pat. Off. |
| 0 612 910 A2 | 8/1994 | European Pat. Off. |
| 2 366 127 | 4/1978 | France |

(List continued on next page.)

*Primary Examiner*—Michael R. Mansen
*Attorney, Agent, or Firm*—Renner, Kenner, Greive, Bobak, Taylor & Weber

[57] ABSTRACT

A sectional door (20) having a plurality of panels (21,22, 23,24) including, a body portion (25) of the panels spacing and joining longitudinal edges (40, 50), one of the edges (40) between adjacent panels on a first panel having a substantially concave curvilinear surface (45) in vertical cross-section, the other of the edges (50) between adjacent panels on a second panel having a substantially planar surface (52) in vertical cross-section, longitudinally-spaced hinges (65) interconnecting the first and second panels for pivotal movement. A panel (22) for sectional door (20) having a generally rectangular foam core (140, 240, 340), an inner surface (145, 245, 345) extending the longitudinal length of said foam core, and a recess (150,250,350) in the inner surface and the foam core extending the longitudinal length of the foam core. Conveyor apparatus (400, 500) for the continuous production of foam-cored door panel material (22') having a first conveyor (410, 501) having a first panel-engaging surface (426, 503) lying in a plane for engaging the planar skin on one side of the panel material, a drive assembly (415, 510) for driving the first conveyor at a selected speed, a second conveyor (402, 502) having second and third panel-engaging surfaces (451, 464; 535, 540) for engaging spaced skin surfaces (146, 146) and an offset skin surface (150), respectively, on the other side of the panel material, and a drive assembly (435, 520) for driving at least one of the second and third panel-engaging surfaces of the second conveyor at substantially the selected speed of the first conveyor.

25 Claims, 21 Drawing Sheets

U.S. PATENT DOCUMENTS

| | | | |
|---|---|---|---|
| 2,681,480 | 6/1954 | Dixon, Sr. | 16/250 X |
| 2,694,234 | 11/1954 | Roby et al. | 16/250 X |
| 2,817,618 | 12/1957 | Hahn | 156/209 |
| 2,817,875 | 12/1957 | Harris et al. | 425/115 |
| 2,852,840 | 9/1958 | Harvey | 228/126 |
| 2,910,741 | 11/1959 | Dettman | 16/250 X |
| 2,952,313 | 9/1960 | Stroup | 160/209 |
| 3,103,410 | 9/1963 | Dobbins | 264/280 |
| 3,160,200 | 12/1964 | McKee et al. | 160/189 |
| 3,165,143 | 1/1965 | Jackwig | 160/189 |
| 3,302,690 | 2/1967 | Hurd | 160/40 |
| 3,319,697 | 5/1967 | Krohn | 160/229.1 |
| 3,322,586 | 5/1967 | Hasenwinkle et al. | 156/201 |
| 3,359,594 | 12/1967 | Pastoor | 16/356 |
| 3,566,448 | 3/1971 | Ernst | 425/4 R |
| 3,635,277 | 1/1972 | Bahnsen | 160/191 |
| 3,648,755 | 3/1972 | Thiele | 160/201 |
| 3,653,569 | 4/1972 | Homstead et al. | 226/140 |
| 3,815,657 | 6/1974 | Malek et al. | 160/229.1 |
| 3,834,967 | 9/1974 | Lowery et al. | 156/356 |
| 3,846,054 | 11/1974 | Davis | 425/110 |
| 3,869,269 | 3/1975 | Knapp | 65/106 |
| 3,878,027 | 4/1975 | Troutner | 425/371 X |
| 3,893,269 | 7/1975 | Nelsson et al. | 52/65 |
| 3,914,084 | 10/1975 | Kornylak | 425/371 X |
| 3,934,635 | 1/1976 | Kin | 160/189 |
| 3,941,180 | 3/1976 | Thill | 160/229.1 |
| 4,040,142 | 8/1977 | Ippolito | 16/251 |
| 4,147,582 | 4/1979 | Brollo | 425/335 X |
| 4,151,031 | 4/1979 | Goad et al. | 156/201 |
| 4,238,544 | 12/1980 | Mullet | 428/71 |
| 4,269,253 | 5/1981 | Ziegler | 160/201 |
| 4,284,118 | 8/1981 | Ceron | 160/229.1 |
| 4,339,487 | 7/1982 | Mullet | 428/71 |
| 4,348,164 | 9/1982 | Fujii et al. | 425/89 |
| 4,387,760 | 6/1983 | Greschbach | 160/229.1 |
| 4,472,910 | 9/1984 | Iha | 49/139 |
| 4,667,724 | 5/1987 | Dragone | 160/229.1 |
| 4,685,266 | 8/1987 | Mullet | 52/309.11 |
| 4,779,325 | 10/1988 | Mullet | 29/460 |
| 4,878,267 | 11/1989 | Roach et al. | 16/250 |
| 4,893,666 | 1/1990 | Hormann | 160/229.1 |
| 4,989,660 | 2/1991 | Wagner | 160/201 |
| 5,001,862 | 3/1991 | Albenda | 49/383 |
| 5,002,114 | 3/1991 | Hörmann | 160/229.1 |
| 5,036,899 | 8/1991 | Mullet | 160/189 |
| 5,043,128 | 8/1991 | Umeda | 264/258 |
| 5,103,890 | 4/1992 | Cloutier | 160/190 |
| 5,170,832 | 12/1992 | Wagner | 160/201 |
| 5,453,231 | 9/1995 | Douglas | 425/371 X |
| 5,458,477 | 10/1995 | Kemerer et al. | 425/371 |
| 5,836,499 | 11/1998 | Mullet et al. | 226/168 |

FOREIGN PATENT DOCUMENTS

| | | |
|---|---|---|
| 2 221 397 | 11/1972 | Germany . |
| 2 225 204 | 1/1974 | Germany . |
| 2 613 629 | 10/1977 | Germany . |
| 38 14275 C2 | 2/1993 | Germany . |
| 39 22981 C2 | 2/1993 | Germany . |
| 92 06 018 | 7/1993 | Germany . |
| 39 22995 C2 | 9/1993 | Germany . |
| 93 08 440 | 9/1993 | Germany . |
| 93 08 874 | 9/1993 | Germany . |
| 42 27311 A1 | 2/1994 | Germany . |
| 94 06 615 | 9/1994 | Germany . |
| WO 93/09325 | 5/1993 | WIPO . |

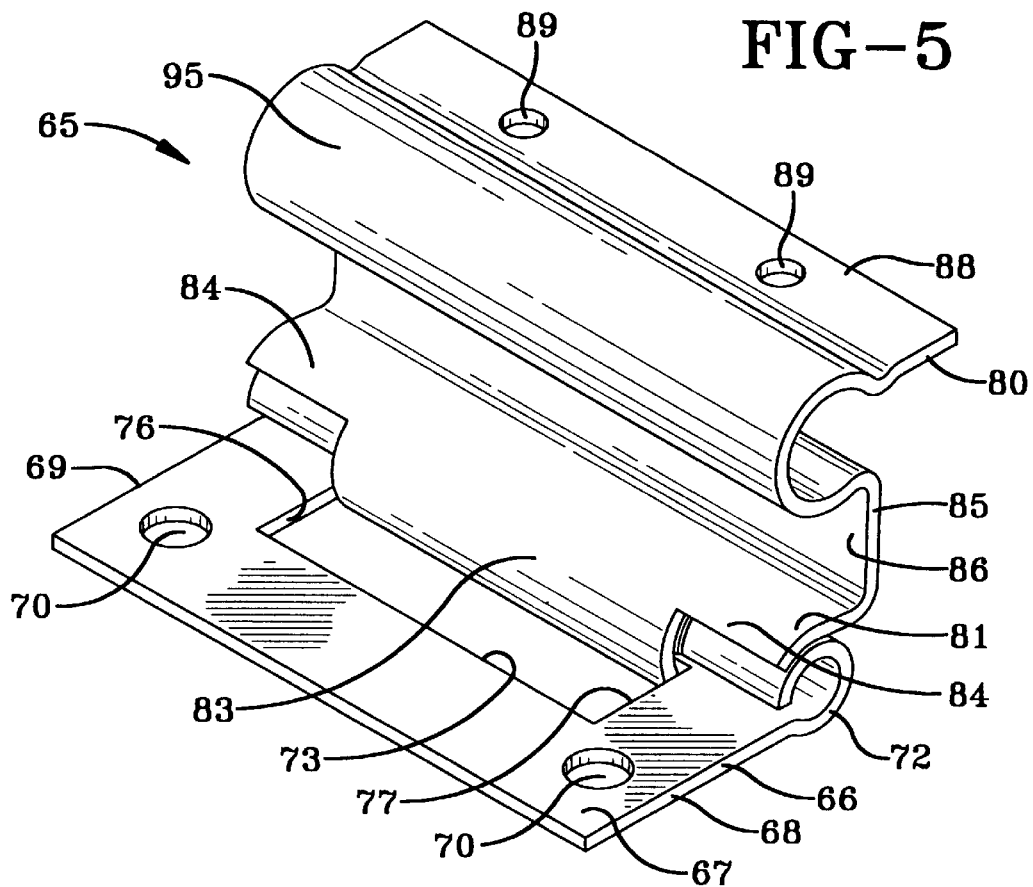
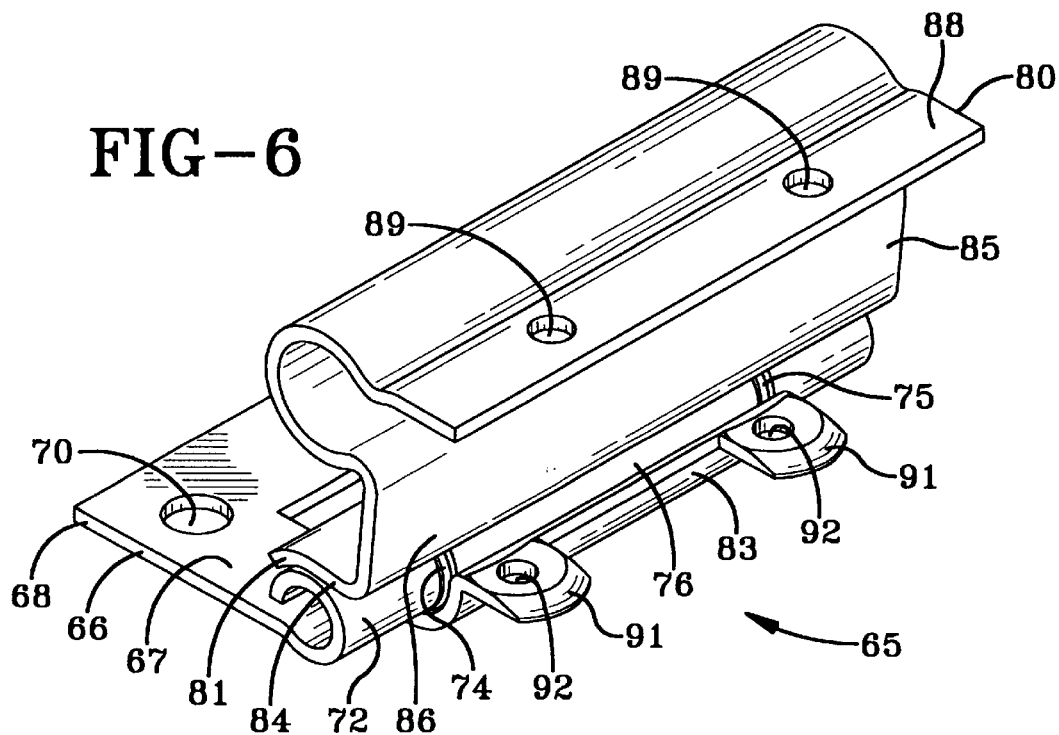

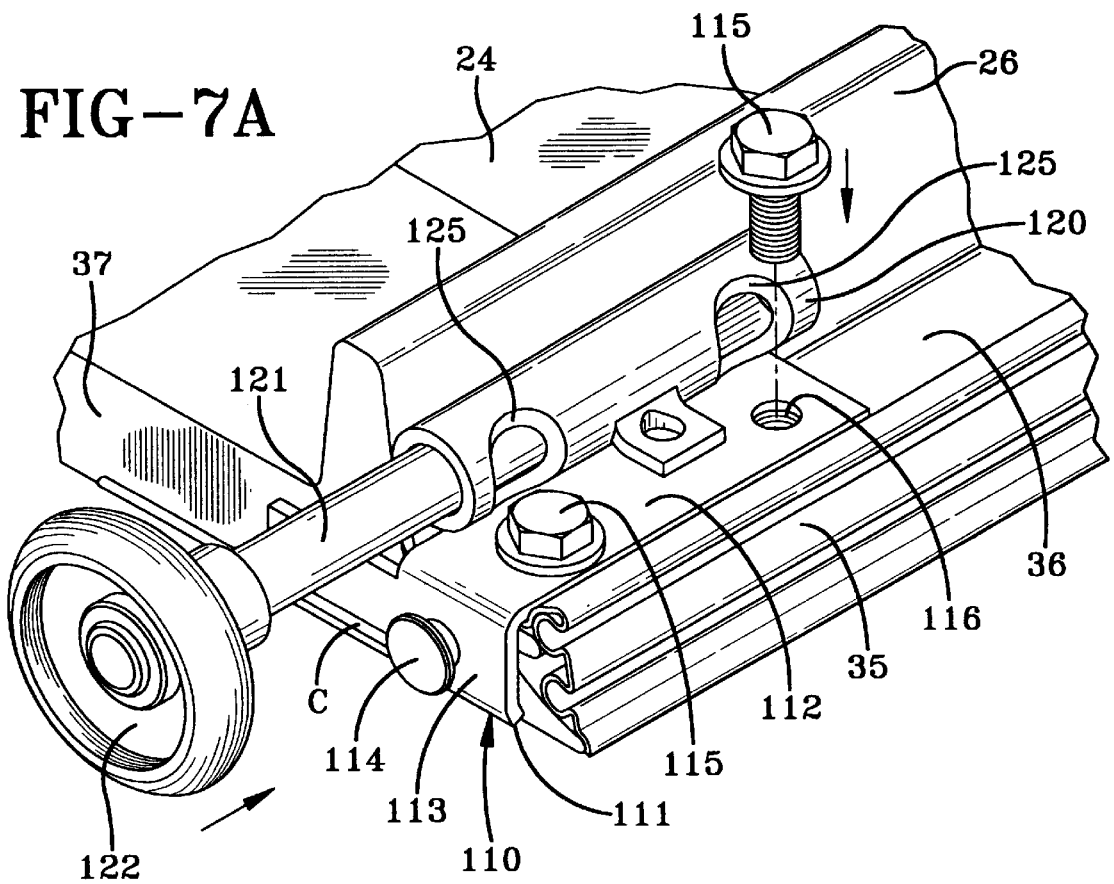

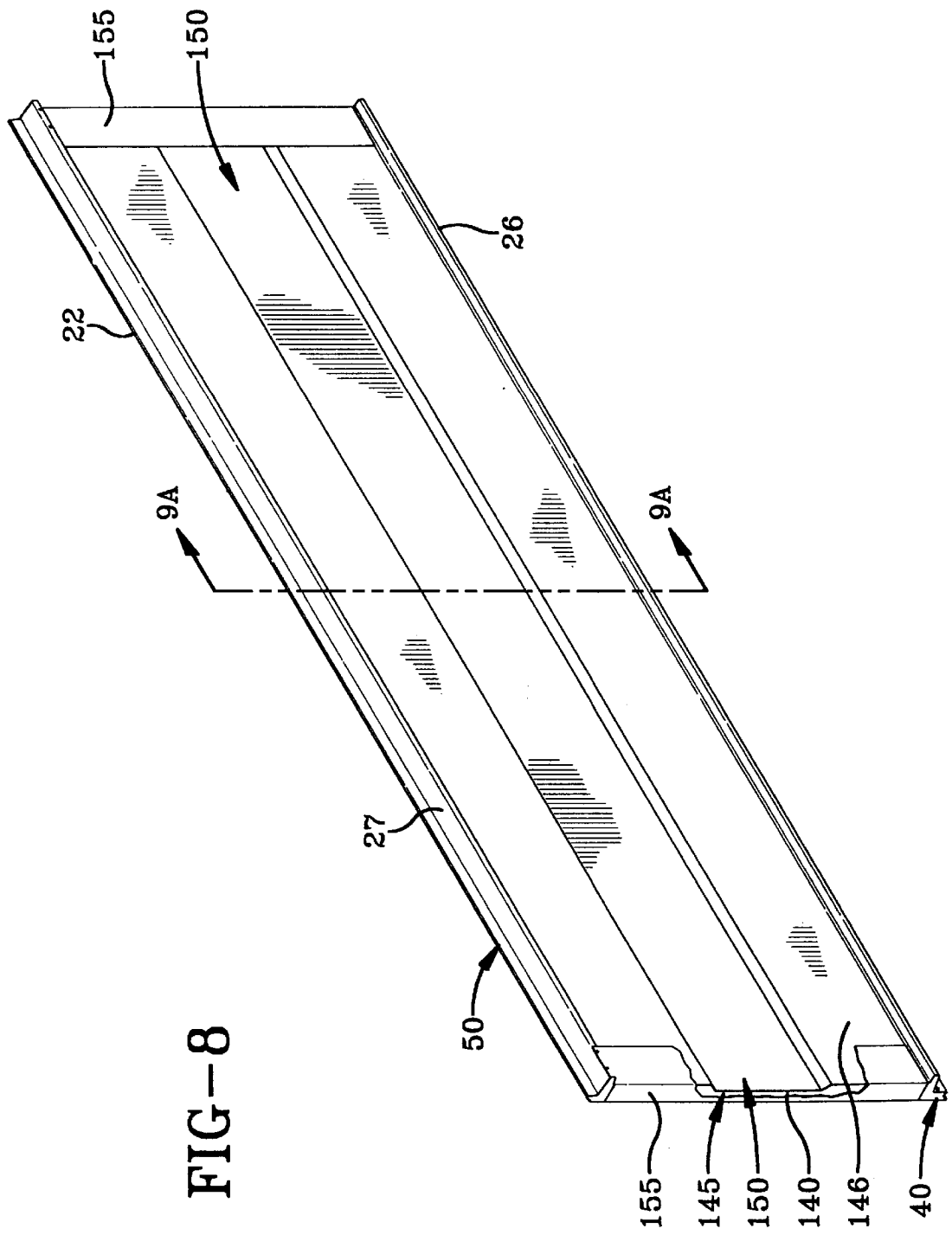

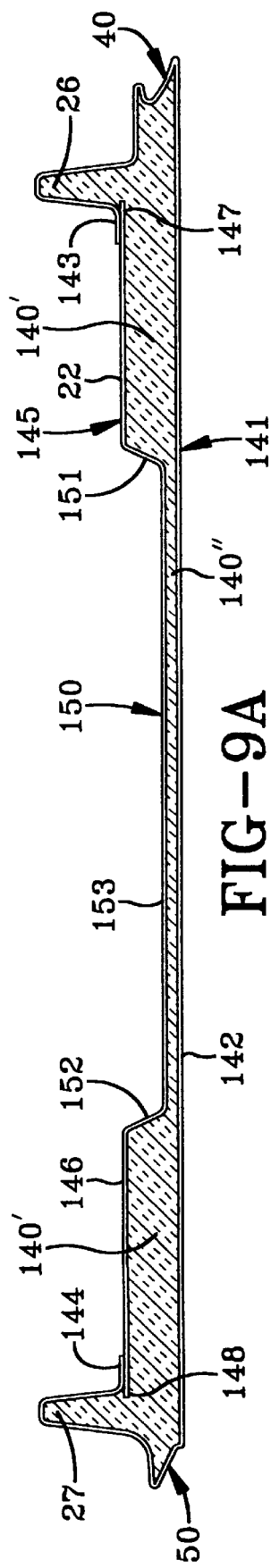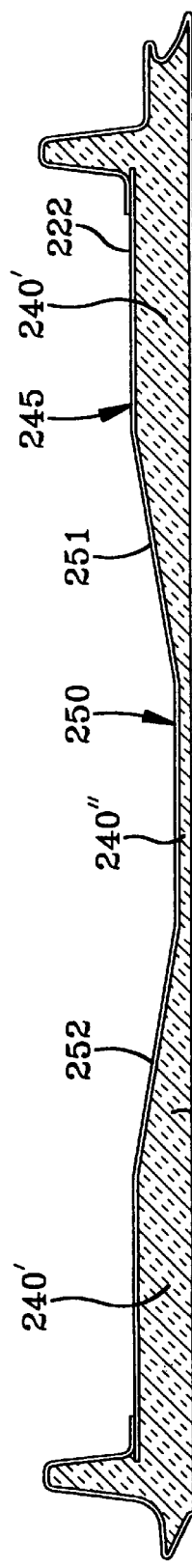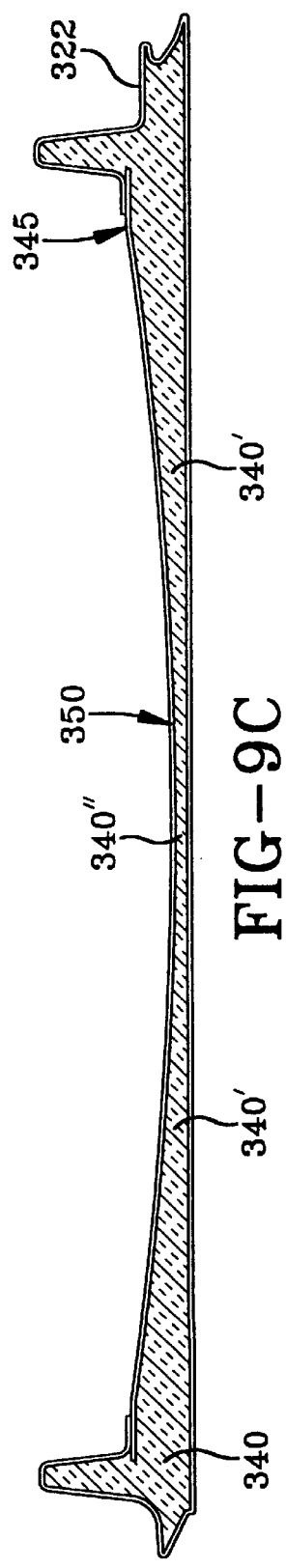

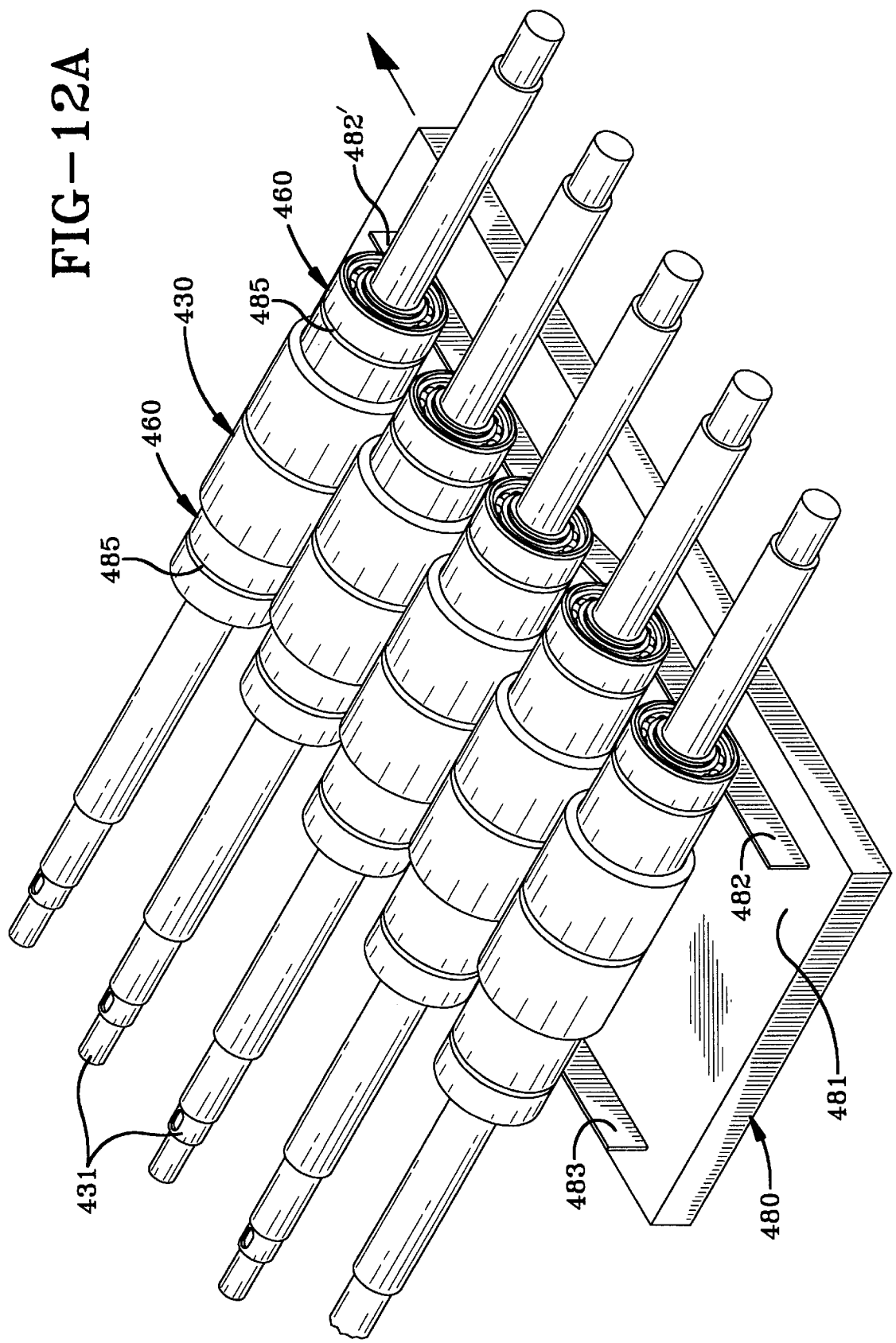

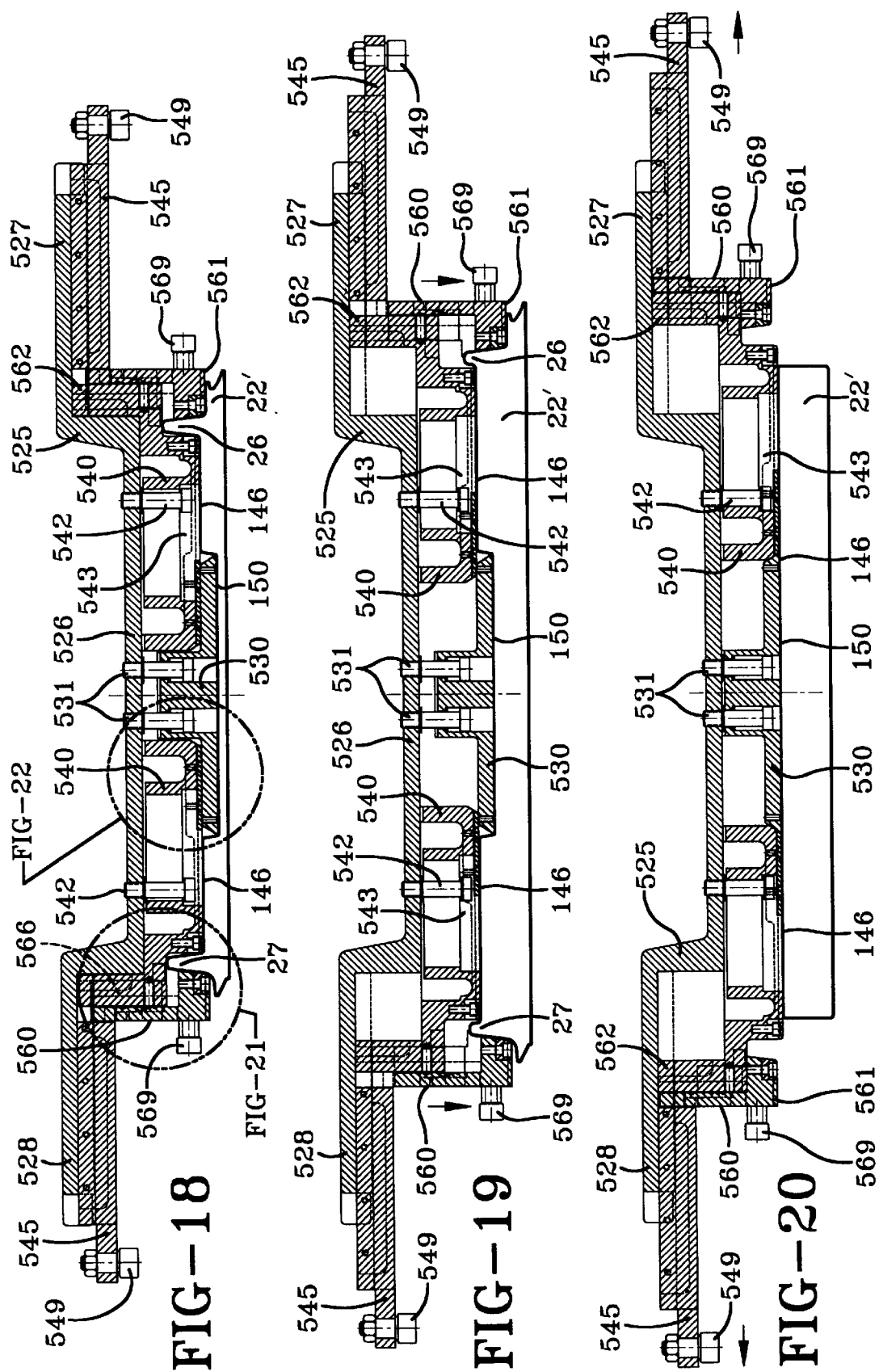

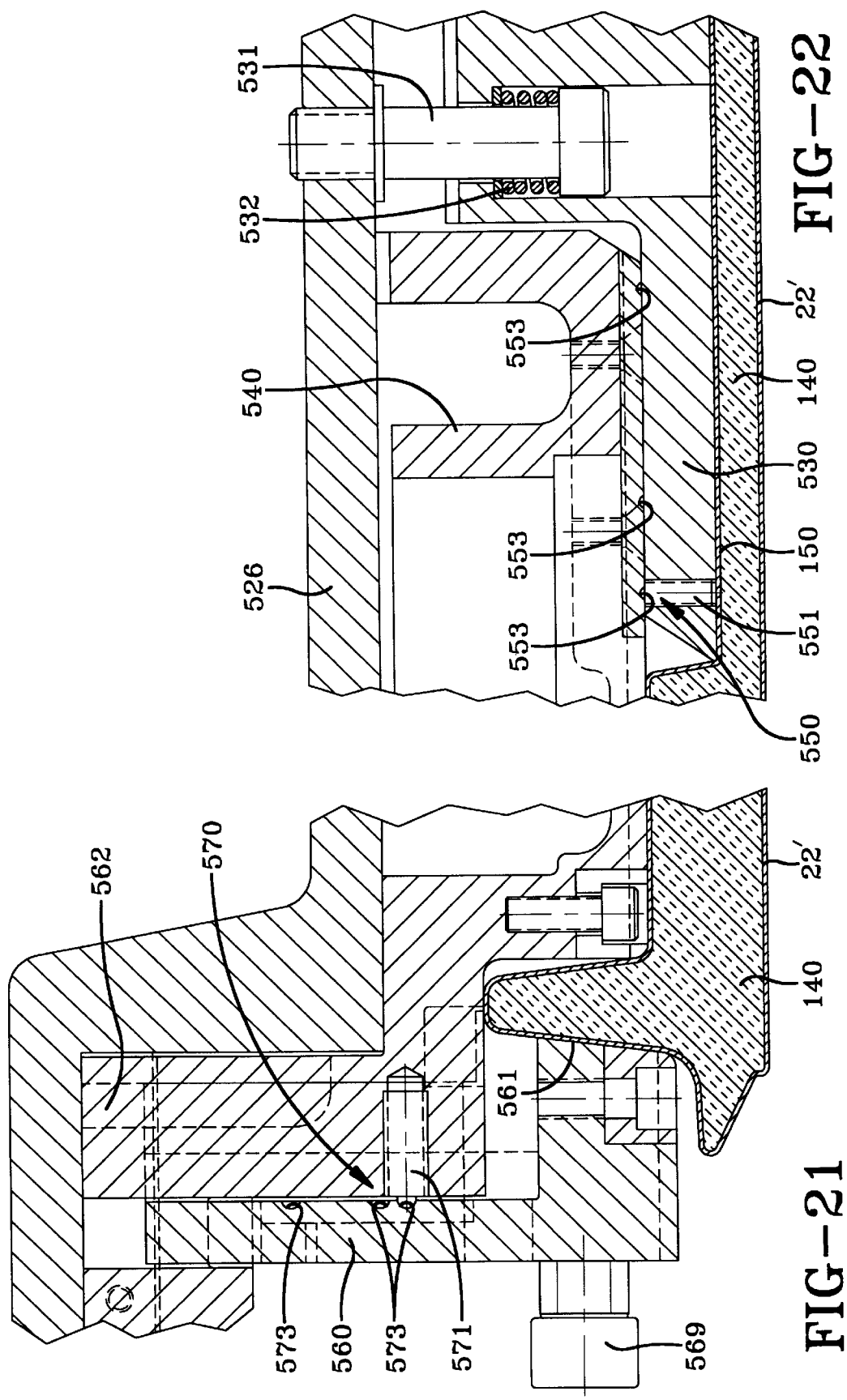

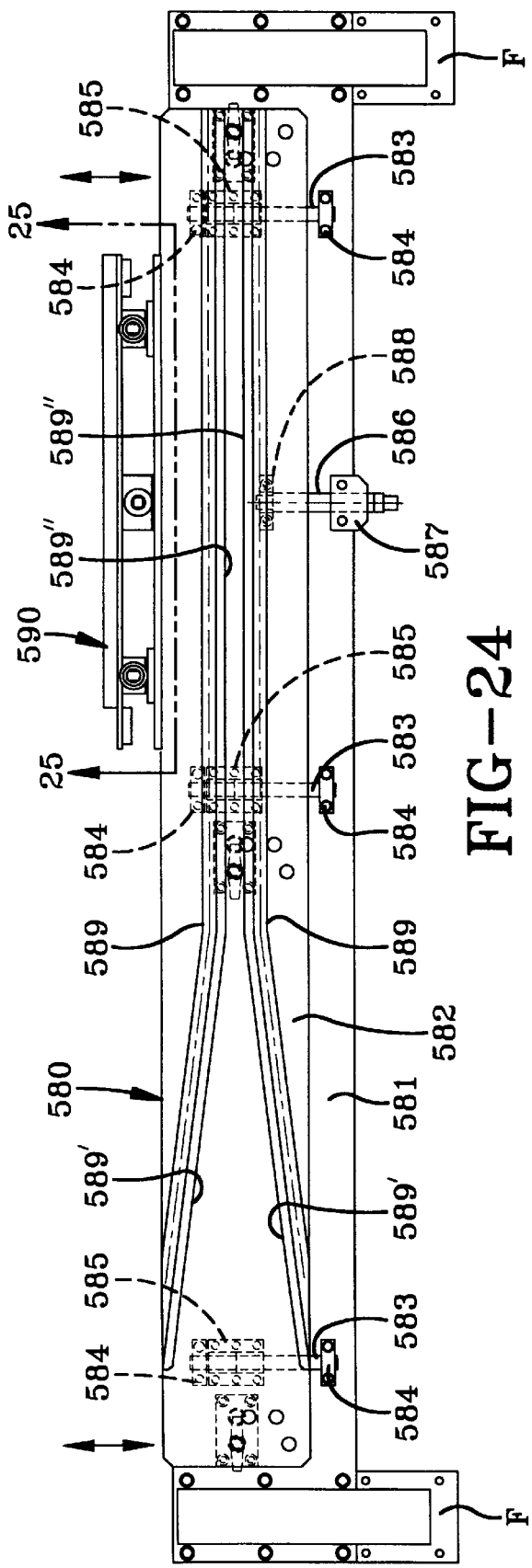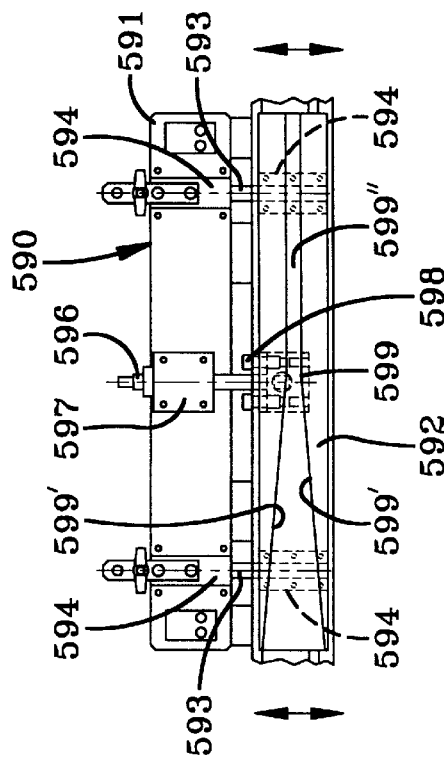

CONVEYOR APPARATUS FOR THE TRANSPORT OF DOOR PANELS

This is a divisional of application Ser. No. 08/380,084 filed Jan. 30, 1995, now U.S. Pat. No. 5,836,499, entitled "Sectional Overhead Door And Apparatus For Making Door Panels", which is a continuation-in-part of our co-pending application Ser. No. 08/260,108 filed Jun. 15 1994, entitled "Sectional Overhead Door".

TECHNICAL FIELD

The present invention relates generally to a panel and hardware components for sectional overhead doors and apparatus for making the panels. More particularly, the present invention relates to a panel and hinge arrangement and a bracket for sectional overhead doors which move between a closed position proximate to a vertical door opening to an open position in substantially horizontal orientation with the door panels articulating through a curved portion of the track system in traversing from the closed to the open position and vice versa. More specifically, the present invention relates to an arrangement for such multi-panel overhead doors having an advantageous door panel configuration, a hinge arrangement providing an anti-pinch feature between adjacent panels during their relative angular articulation, a bottom bracket with a safety feature, and apparatus employed in the manufacture of the panels.

BACKGROUND ART

Sectional overhead doors have been commonly employed for many years as garage doors in homes, commercial and utility building doors, and in similar applications. The panels of conventional sectional doors are commonly joined by hinges positioned on the inner or internal side of the door which form pivot points proximate the juncture between each of the adjacent panels to permit the panels to pivot relative to each other. The hinges at the lateral edges of the panels or separate mounting brackets carry shaft-mounted rollers which inter-engage with track sections that control the path of travel of the doors. These track systems commonly include a generally vertical section positioned proximate a door frame or other opening and a generally horizontal section that extends substantially perpendicular to the vertical section rearwardly into the interior of the building in an overhead position. A curved transition section is normally positioned proximate the header at the top of the door frame and interconnects the vertical section and the horizontal section to provide a continuous track system. The hinges permit the door panels to articulate as the rollers interconnecting the door and the track system traverse from the vertical section through the transition section to the horizontal section of the track and vice versa.

Hinges employed for such sectional overhead doors have remained of generally consistent design over many years. Most commonly the hinges have been stamped from relatively lightweight steel, with the formation of gussets and sidewalls to obtain the requisite strength. The two hinged leaves with the formed contours are normally attached at their knuckle areas by a pivot pin. The pivot pins are commonly a rolled pin formed of the same or a comparable light-gauge steel and flared at the end during assembly for retaining the pin in the knuckles. The hinge leaves may be provided with an additional roll pin supported in a flange and mounting guide rollers which engage the track sections. Hinges of this type tend to be relatively crude and are noted for binding and poor operation, at least after some operating period if not shortly after installation. Particularly troublesome in this respect is the lack of uniformity of the flaring of the rolled pivot pins, which is notoriously imprecise. Further, with the rolled pin configuration, the extreme lateral edges of the hinge material end up serving as the bearing surface between the hinges and the rolled pivot pin.

In some instances, sectional doors for certain applications have been made which employ interfitting cylindrical members at the edges of adjacent panels. Normally, these cylindrical members have constituted an extension of a wall or covering for the panels, which extend the entire lateral width of the panels. Each of the panel extensions are formed into a segment of a cylinder at a pivot joint, with one being radially slightly smaller than the other to interfit therein. Frequently, a tubular bearing member is inserted within the interfitting cylindrical members to serve as a hinge pin and to receive the shaft for a roller extending outwardly for engagement with a track positioned proximate to the door. Such interfitting cylindrical members, however, in extending the full length of the door, require a considerable amount of additional material at substantial cost. Additionally, hinges extending the full transverse width of a door panel, particularly in sizeable doors, are prone to binding and chafing over large surface areas of the cylindrical hinge members due to the inevitable bending or deflection which necessarily takes place over the substantial lateral extent or width of the cylindrical hinge members.

A recently significant consideration which is involved in the configuration and operation of the hinges and the interconnected panels is that of providing an anti-pinch characteristic. This refers to the provision of some type of structure to cover or minimize the gap formed between the panels, particularly at their position of maximum angularity when traversing the curved transition section of the interrelated track, such as to prevent the insertion of a person's hands or fingers whereby they could be pinched as the door moves between the track sections. In this respect, it has been empirically determined that a gap between the edges of adjacent panels during articulation of the door panels not exceeding approximately 0.2 in. or 5 mm. satisfies these requirements.

To date, various approaches have been taken to incorporate anti-pinch features to some extent into sectional overhead doors. One approach for providing an anti-pinch joint between adjacent panels of a sectional overhead door is to create an external barrier which is designed to preclude the entrance of a person's finger or other object into the hinge area. Anti-pinch devices of this type may be made of rigid or somewhat flexible materials and are characteristically attached to the outside of the door panels in proximity to the hinge area. For the most part, these barriers are formed or in some manner biased, as by a spring or otherwise, to maintain the barrier material in contact with the exterior surface of adjacent door panels throughout the pivotal action of the panels when traversing between the vertical and horizontal track sections. Such external barriers often require a substantial amount of material, as well as precise positioning and operation, to insure that the external barrier is maintained during the entirety of the angular movement which takes place between the panels. Flexible external barrier devices may be subject to damage or deterioration caused by weather conditions due to their outward, fully exposed positioning. As a result of these drawbacks, efforts have been made to provide anti-pinch devices which take a form other than an external barrier.

More recently, efforts have been made to construct what might be termed an internal barrier to accomplish an anti-pinch function. Doors of this type endeavor to provide contours on the mating edges of adjacent panels, such that an overlapping surface or a gap too narrow for the insertion of a person's finger is presented at all times during the angular rotation between adjacent panels from the smallest to the largest angular orientations for a particular sectional overhead door system.

Numerous problems, however, have been encountered in the application of an internal barrier configuration to overhead door panels. In some instances, intricate configurations are employed which may tend to cause very stringent fabrication requirements or unduly precise installation procedures. Any deficiencies in these respects normally result in door panels which minimally interfere or bind to a sufficient extent to cause highly undesirable drag in the movement of the door. In some instances, the contoured panel edges may be configured, such that it is difficult or impossible to effect the attachment of hinges at a sufficiently reinforced surface or at locations where the pivot axis of the hinges is optimally located. In other instances, the edge configurations make sealing against water and air filtration extremely difficult, if not impossible. Another problem with the use of contoured edges is that in many instances it is difficult to achieve a rapid separation of the interfitting surfaces as soon as an angularity between the panel commences to preclude the introduction of undesirable drag forces. To Applicants' knowledge, no internal barrier configuration has fully satisfied all these various competing requirements.

Sectional overhead doors also normally employ brackets rather than hinges to mount rollers proximate the upper edge of the top panel and proximate the lower edge of the bottom panel. The bottom bracket located proximate the lower edge of the bottom panel also serves the purpose of providing a connector for attachment of the counterbalancing system to the door. In particular, the bracket has an anchor for attachment of the end of the cable which interrelates with the tensioning elements, commonly springs, of the counterbalance system for the door. The brackets also normally have an attached cylindrical sleeve for receiving a shaft mounting a roller that is affixed to a mounting plate of the bracket, which is normally attached to the door by fasteners. The fasteners are normally located spaced from the cylindrical sleeve to permit easy access by tools for operating the fasteners.

This common arrangement can produce a significant safety hazard when installation and repair personnel or owners of buildings having such sectional overhead doors attempt to effect adjustment or replacement of damaged bottom bracket components. The problem from a safety vantage arises when a person endeavors to loosen or remove the bottom bracket from the door with the door in the closed, vertical position. Under this condition, the counterbalance system is exerting maximum force on the bottom bracket through the connecting cable. As a result, if the fasteners on the bottom bracket are removed or nearly removed, the counterbalance system operating through the connecting cable forces the entire bottom bracket upwardly at great force and speed causing the potential for serious injury to a person in close proximity endeavoring to remove the bracket. In many instances, persons working on an overhead door do not perceive the impending danger associated with removal of the bottom bracket in the closed, vertical position until the above-described dangerous result has taken place.

In recent years, panels for sectional overhead doors of the type described herein constructed of foam with a skin cover have enjoyed increasing popularity. Refinements in such door panels have come largely in terms of the materials or combinations of materials employed in the skin. While light-gage steel is commonly used for the outer skin exposed to the outdoor environment, less expensive materials, such as treated or metallic-coated paper and non-metallic sheet materials, are increasingly employed as inner skin coverings for selected applications. Efforts have also been made in foam compounding to develop less expensive foams having the required strength and insulation qualities. What has remained constant is the notion that a substantially uniform thickness of foam, whether precut inserts or expanded in place, is necessary to achieve required strength and insulation characteristics of panels having a foam core.

In a general sense, various apparatus for the production of conventional sectional overhead door panels has been developed in the industry. In some instances, pre-formed foam slabs have been cut to appropriate sizes and assembled by hand on conveyor lines with an outer skin, an inner skin, stiles, and one or more ribs or struts. In other instances, relatively high-speed, continuous production equipment has been developed to achieve substantially automated production of panels.

Existing continuous production equipment has normally been subject to a variety of relatively severe limitations and/or disadvantages. In order to achieve essentially automated production, it is necessary that foam be continuously dispensed within the skins of a moving panel at the time of or before forming the enclosed panels. It is, however, necessary during the expansion of the foam in an oven that the normally relatively thin skins forming the sides of the panel be supported, as by a conveyor surface moving at substantially the same velocity, to withstand the internal pressure created by the foam until it becomes substantially set. Both flat platen or slat conveyors and conventional roller conveyors may be employed in an oven to meet these requirements.

The use of flat platens and conventional roller conveyors has, for the most part, limited panel configurations to essentially rectangular shapes with substantially planar surfaces. The use of longitudinal reinforcing struts or ribs which are advantageously also interiorly foamed require corresponding recesses in the platens or rolls. However, it is often necessary, or at least desirable, to have different strut dimensions and locations for the three or four different panel sizes necessary to provide, for example, the several different standard door heights. To thus provide different platens or rollers for each panel size and type can result in an inordinate number of platens and rollers, considering that such conveyors commonly have many dozens of rollers. In addition, many hours of production time may be lost in changing the numerous platens or rollers each time a changeover is made to run a different panel. As a result, sectional overhead doors have tended to be relatively expensive and/or designed with significant structural compromises to maintain equipment costs and manual changeover expenses within permissible bounds.

DISCLOSURE OF THE INVENTION

Therefore, an object of the present invention is to provide a sectional overhead door having bottom edge profiles and top edge profiles which interfit on adjacent panels to provide an anti-pinch function. Another object of the invention is to provide such panels which have edge profiles that interfit during articulation of the panels as the door moves between the closed, vertical position and the open, horizontal position, such as to prevent insertion of hands or fingers of a person between the panel profiles during articulation of adjacent panels. A further object of the present invention is to provide such edge profiles that can be adjusted to eliminate the rubbing or abrading of mating profiles, which would create a drag that would require additional counterbalancing to overcome.

Another object of the present invention is to provide a sectional overhead door with panel profiles that can be configured of various types of material, including lighter gauge steels, wherein the edge profiles can operate in close proximity to each other without engaging. Yet another object of the present invention is to provide such edge profiles which interfit in a manner to prevent air and/or water infiltration between adjacent panels when the door is in the closed, vertical position. Still a further object of the present invention is to provide such edge profiles that are configured to seat a strip of foam or other weather-sealing material, which enhances the weather-sealing capability and may provide the requisite spacing between adjacent profiles during installation of a sectional door.

Another object of the present invention is to provide a sectional overhead door wherein the panels may be constructed of a variety of materials or laminates of various materials to create panels having varying desired amounts of strength. Still a further object of the present invention is to provide such panels which may have strengthening struts to effect increased rigidity to the panels and to assist in the attachment of hinges for interconnecting adjacent panels. Still another object of the present invention is to provide such panels which have the various advantageous operational features, while requiring only relatively small hinges intermittently spaced along the width of a particular sectional door. Another object of the invention is to provide such panels wherein the entire anti-pinch barrier is formed with the surface material of the panels without additional components to thereby minimize overall door weight and cost. Another object of the present invention is to provide a sectional overhead door having hinges which are configured to accommodate the edge profiles of the panels. Still a further object of the present invention is to provide such hinges that are constructed of a minimum of pieces consisting of a pair of interlocking hinge elements which do not require a hinge pin. Still another object of the present invention is to provide such hinges with a cylindrical knuckle on one hinge element and a tongue on the other element having an internal diameter substantially equal to the external diameter of the cylindrical knuckle with raised bearing surfaces on the knuckle or tongue to minimize friction during relative rotation between the hinge elements.

Still another object of the invention is to provide such a sectional overhead door having hinges which prevent disassembly of the hinges when the hinge elements are attached to the door panels in operative position, yet permit the detachment of damaged hinge elements from a door and their ready replacement. Still a further object of the invention is to provide such hinges which may be variably configured to form roller mounts in selected positions to mount rollers positioned at different distances from the back of a door panel to achieve appropriate relief of the door from the door frame during operation. Still a further object of the invention is to provide such hinges which may have offset portions to serve as a backup plate when attaching to relatively thin door materials to thereby avoid the necessity of additional components or material to effect a hinge back-up function.

Another object of the present invention is to provide a sectional overhead door having a bottom bracket configuration which, as a safety feature, precludes removal of the bottom bracket from a door when the cable interconnecting the door with the counterbalance system is tension loaded. Still a further object of the invention is to provide such a safety bracket wherein the fasteners attaching the bracket to the door cannot be removed because the positioning of the sleeve supporting the roller shaft engaging the tracks interferes with removal of the fasteners when the counterbalance cable is tensioned, at which time the shaft and roller cannot be removed from the sleeve. Another object of the present invention is to provide such a bottom bracket which may be otherwise installed and operates in the manner of a conventional bottom bracket.

A further object of the present invention is to provide an improved overhead door panel which can be made of all conventional foams and skin materials or combinations thereof. Another object of the present invention is to provide such an improved door panel which can be adapted to different panel configurations and to various types of operating hardware to satisfy varying cost and climatic parameters. Still another object of the present invention is to provide such an improved door panel which can substantially maintain strength and insulation specifications for a foam-filled panel, while employing a substantially reduced quantity of foam per panel to thus realize significant cost savings.

An object of another aspect of the present invention is to provide curing oven conveyor equipment for the manufacture of door panels for sectional overhead doors and other types of door, wall, and panel applications in a continuous, substantially automated production line. A further object of the invention is to provide such curing oven conveyor equipment which can produce a variety of panel configurations having different widths and/or thicknesses. Yet another object of the invention is to provide such curing oven conveyor equipment which can be quickly and easily adjusted with a minimum of manual labor from a configuration for producing one panel width and thickness to a configuration for producing another panel width and thickness.

A further object of the present invention is to provide curing oven conveyor equipment having a conveyor with panel engaging surfaces for engaging two non-planar skin surfaces on one side of the panel in the configuration of the improved overhead door panel of the present invention. Still another object of the invention is to provide such conveyor equipment having a plurality of panel engaging surfaces all moving at substantially the same velocity as the underlying panel skin surfaces to thereby eliminate relative motion between the panel engaging surfaces and the panel skin, which could produce pulling and abrading. Still a further object of the invention is to provide such conveyor equipment having at least one panel engaging surface which telescopes within another panel engaging surface for varying the width of the panel engaging surfaces to accommodate panels having different widths. An object of one embodiment of the conveyor equipment of the present invention is to provide a conveyor assembly having a driven panel engaging surface of rollers of one diameter and one or more non-driven panel engaging surfaces of rollers of a different diameter.

In general, the present invention contemplates a sectional door having a plurality of panels articulated at the joinder between adjacent panels for moving between a closed position and an open position including, a body portion of the panels spacing and joining longitudinal edges, one of the edges between adjacent panels on a first panel having a substantially concave curvilinear surface in vertical cross-section in the closed position of the door, the other of the edges between adjacent panels on a second panel having a substantially planar surface in vertical cross-section in the closed position of the door extending angularly from substantially the outer surface of the door, longitudinally-spaced hinges interconnecting the first and second panels for pivotal movement between planar and varying angular orientations when moving between the open position and the closed position with the concave surface and the planar surface in facing relation in the closed position, the planar surface and the concave surface remaining in sufficiently close proximity during the entirety of the pivotal movement of the first and second panels so as to preclude the insertion of a person's finger therebetween while maintaining adequate clearance to avoid interference.

The present invention also contemplates a pivotal connector for a sectional door having a plurality of panels articulated at the joiner between adjacent panels including, a first hinge element having a first leaf overlying a portion of one of the adjacent panels, apertures in the first leaf for receiving fasteners to effect attachment of the first leaf to one of the adjacent panels, a generally cylindrical first knuckle at one edge of the first leaf, a through slot in the first leaf proximate to the first knuckle, a second hinge element having a second leaf overlying the other of the adjacent panels, bores in the second leaf for receiving fasteners to effect attachment of the second hinge element to the other of the adjacent panels, and a generally cylindrical second knuckle at one edge of the second hinge element extending into the through slot and rotatable about the first knuckle for controlled relative pivotal motion between the first hinge element and the second hinge element.

The present invention further contemplates a bracket assembly for the bottom of the lower panel of a sectional overhead door operable by rollers in a track system and counterbalanced by a tensioned cable including, an L-shaped plate overlying a portion of the inner surface and side edge of the lower panel, anchor means for securing the cable to the plate, a generally cylindrical sleeve affixed on the plate for receiving a shaft mounting one of the rollers, fasteners for attaching the L-shaped plate to the lower panel positioned to underlie a portion of the cylindrical sleeve and the shaft, and cut-outs in the cylindrical sleeve positioned substantially above the fasteners, whereby the fasteners may be removed only when the shaft is not positioned in the cylindrical sleeve.

The present invention additionally contemplates a panel for a sectional door employing a plurality of such panels articulated at the joiner between adjacent panels for moving between a closed position and an open position, including a generally rectangular foam core, an outer surface extending the longitudinal length of the foam core, an inner surface extending the longitudinal length of the foam core, an edge profile extending the longitudinal length of the foam core and interconnecting the outer surface and the inner surface, struts on the inner surface extending the longitudinal length of the foam core and positioned proximate to the edge profile, and a recess in the inner surface and the foam core extending the longitudinal length of the foam core.

The present invention further contemplates conveyor apparatus for the continuous production of foam-cored door panel material for making door panels of the present invention including, a first conveyor having a first panel-engaging surface lying in a plane for engaging the planar skin on one side of the panel material, a drive assembly for driving the first conveyor at a selected speed, a second conveyor having second and third panel-engaging surfaces for engaging spaced skin surfaces and an offset skin surface, respectively, on the other side of the panel material, and a drive assembly for driving at least one of said second and third panel-engaging surfaces of said second conveyor means at substantially the selected speed of the first conveyor.

BRIEF DESCRIPTION OF THE DRAWINGS

FIG. 5 is a perspective view depicting the structure of and the relationship between the two elements of the hinge.

FIG. 6 is a reverse perspective view of the hinge elements of FIG. 5 showing other structural aspects of the hinges and particularly the interrelationship of the knuckle elements thereof.

FIG. 7A is a perspective view depicting a bottom bracket according to the concepts of the present invention shown in the process of installation at the lower corner of the bottom panel of the door with the roller shaft partially inserted to permit installation of one of the fasteners through a cutout in the roller shaft sleeve.

FIG. 7B is a view similar to FIG. 7A showing the bottom bracket fully installed with the roller shaft operatively positioned in the sleeve, thereby precluding removal of the fasteners.

FIG. 8 is a perspective view of a preferred form of panel construction according to the concepts of the present invention for the sectional overhead door herein disclosed.

FIG. 9A is a cross-sectional view of the panel of FIG. 8 taken substantially along the line 9A—9A of FIG. 8.

FIG. 9B is a cross-sectional view similar to FIG. 9A showing a panel having a modified form of recess in the inner surface.

FIG. 9C is a cross-sectional view similar to FIGS. 9A and 9B showing another modified form of recess in the inner surface.

FIG. 12A is a fragmentary perspective view similar to FIG. 12 showing the derailer moving in relation to a plurality of upper conveyor rollers with some positioned at a lesser lateral extent of the rollers of the upper conveyor, some positioned at a greater lateral extent of the rollers, and some in transition therebetween.

FIG. 18 is a cross-sectional view of the platen of FIG. 17 taken substantially medially thereof and positioned for engagement with the laterally narrowest and thinnest panel material which the platen is adapted to process.

FIG. 19 is a cross-sectional view similar to FIG. 18 showing the platen adjusted to engage the laterally widest and thickest panel material which the platen is adapted to process.

FIG. 20 is a cross-sectional view similar to FIGS. 18 and 19 showing the platen adjusted to present a planar panel engaging surface for engaging a panel having an inner skin which is entirely or substantially planar.

FIG. 21 is an enlarged fragmentary cross-sectional view of the portion of the platen of FIG. 18 designated as FIG. 21 and showing details of the height-positioning mechanism which maintains the platen in a given adjustment for a particular height.

FIG. 22 is an enlarged fragmentary cross-sectional view of the portion of the platen of FIG. 18 designated as FIG. 22 and showing details of the width-positioning mechanism which maintains the platen in a given adjustment for a particular panel width.

FIG. 24 is a fragmentary plan view taken substantially along the line 24—24 of FIG. 3 showing details of the width-adjusting mechanism for the platens of the upper conveyor assembly.

FIG. 25 is a fragmentary elevational view taken substantially along the line 25—25 of FIG. 24 and showing particularly details of the height-adjusting mechanism for the platens of the upper conveyor assembly.

PREFERRED EMBODIMENT FOR CARRYING OUT THE INVENTION

Figure 1:
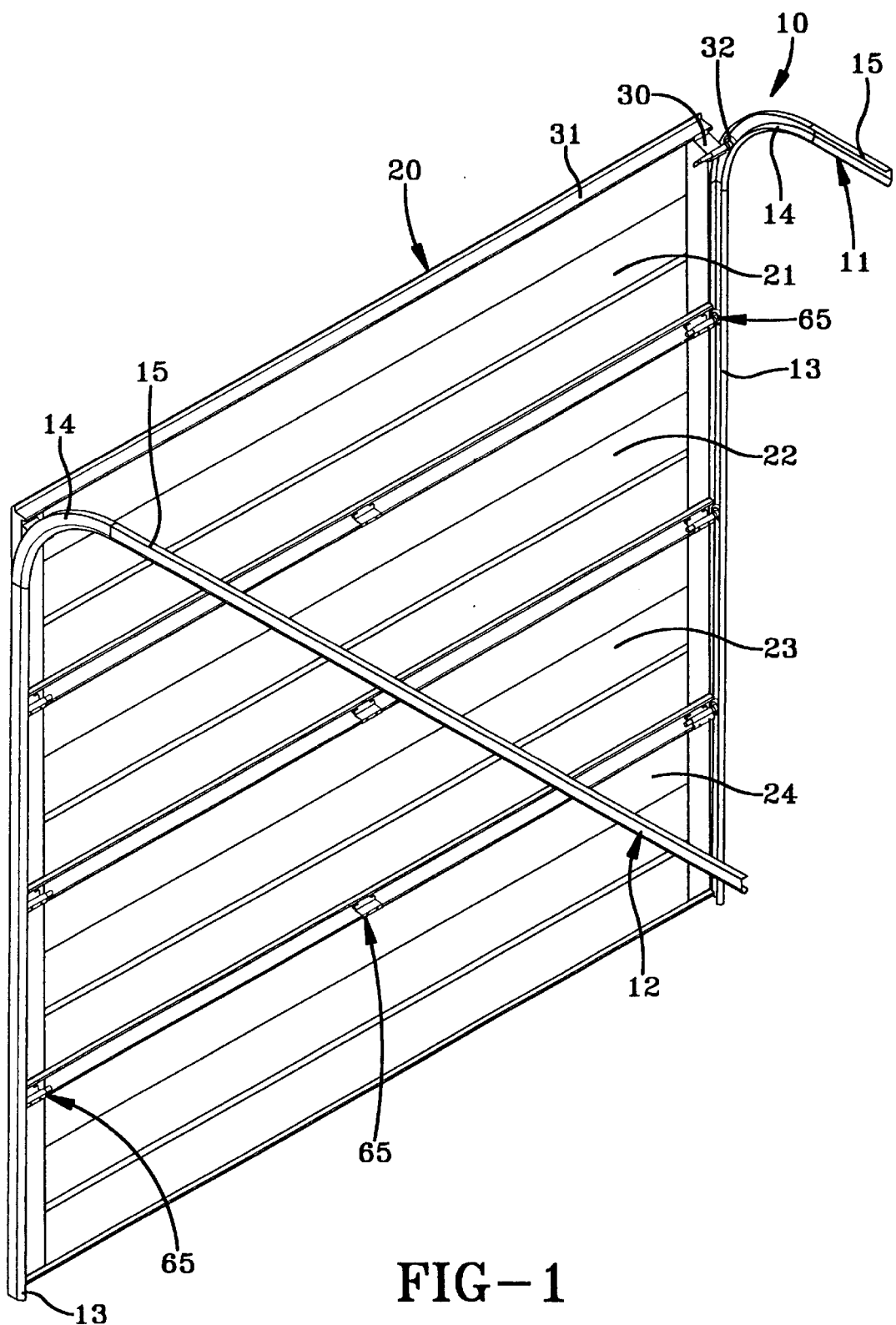
FIG. 1 is a perspective view of the interior of a sectional overhead door incorporating hinges and brackets according to the concepts of the present invention with the door shown in the vertical, closed position on the rails.

A sectional overhead door system embodying the concepts of the present invention is generally indicated by the numeral 10 in FIG. 1 of the drawings. The door system 10 includes a pair of spaced track assemblies, generally indicated by the numerals 11 and 12. As shown, the track assemblies 11 and 12 are symmetrically opposite but otherwise structurally identical. The track assemblies 11, 12 each have a vertical track section 13 of appropriate length to extend substantially the distance from the ground or floor of a garage or other structure to a position proximate the header of a door frame in which the door system 10 is to be mounted. Atop each vertical track section 13, there is a curved transition track section 14. The curved transition track sections 14 are normally connected to the vertical track sections 13 as by connector plates (not shown) and bolts or rivets (not shown) according to common practice in the industry. The curved transition track sections 14 are in turn attached in an identical manner to horizontal track sections 15, which extend preferably substantially horizontally inwardly into the building from the door frame a distance comparable to the length of vertical track sections 13.

The vertical and horizontal track sections 13, 15 are normally constructed of straight pieces of rail which are cut to length for a particular door opening and attached by brackets (not shown) or comparable elements to the door frame. It is to be appreciated that the track assemblies 11, 12 and their positioning with respect to a door frame are in accordance with standard practice in the industry. In addition, all of the track sections 13, 14, and 15 may have the generally J-shaped, cross-sectional configuration which is commonly known and used in the industry.

As shown, the sectional door, generally indicated by the numeral 20, of the door system 10 is guided, and in part supported, by the track assemblies 11, 12. For exemplary purposes, a four-panel sectional door 20 is shown in FIG. 1 of the drawings. However, it will be appreciated by persons skilled in the art that five, six, or more panels may be employed in sectional doors of this type, depending upon the height of the door opening and related considerations.

As shown, the sectional door 20 consists of a top panel 21, an upper middle panel 22, a lower middle panel 23, and a bottom panel 24. The panels 21, 22, 23, and 24 are interrelated to each other and to the track assemblies 11, 12 in a manner described hereinafter. In conventional fashion, the top panel 21 carries preferably near the top edge 31 thereof a top bracket 30 which mounts a roller 32 that is offset from the door 20 a distance to effect closure of the top panel 21 when the door 20 is in the vertical, closed position.

Figure 3:
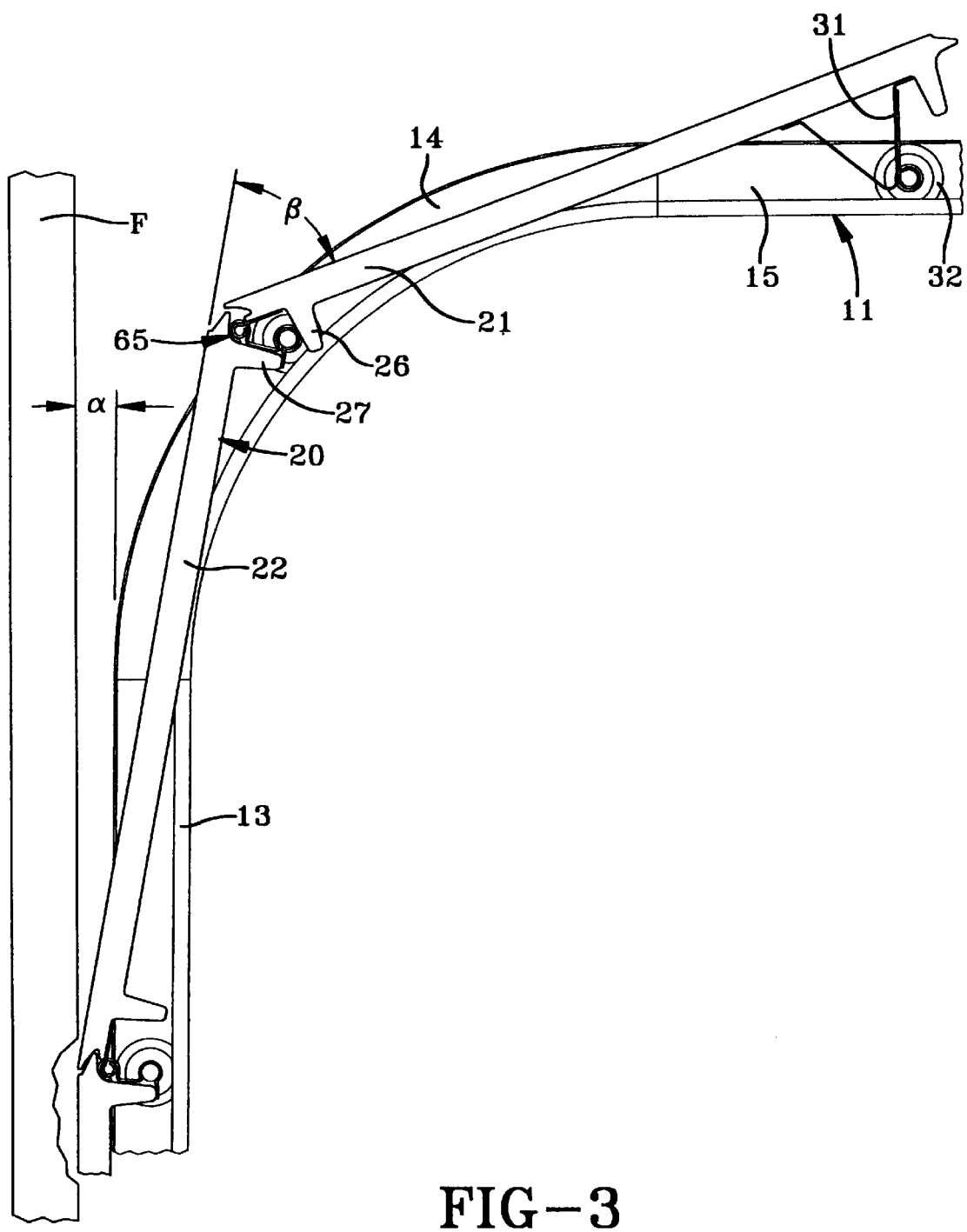
FIG. 3 is a side-elevational view of the sectional overhead door of FIG. 1 showing a fragmentary portion of the rail and door with the door panels depicted in a position of substantially maximum angular orientation with the roller adjacent the hinge positioned substantially medially of the curved transition track section between the vertical track and the upper horizontal track.

Referring now to FIG. 3 of the drawings, it is to be understood that in order to keep the sectional door 20 free from frictional resistance as it approaches and departs from the fully closed position depicted in FIG. 1 and thus permit substantially unobstructed vertical motion, the vertical track section 13 is normally located at an angle α of approximately one degree with respect to the door frame F. It will thus be appreciated that the vertical track section 13 is displaced progressively upwardly from the floor an increasing distance from the door frame F, which is designed to be a substantially plumb vertical line. Thus, the top bracket 30, in being positioned above the top of the vertical track section 13 and normally in the transition track section 14, must necessarily displace the roller 32 a substantial distance from the top panel 21.

The articulation between panels 21 and 22, 22 and 23, and 23 and 24 and the anti-pinch feature of sectional door 20 are effected by the configurations of the panels and their interconnection as hereinafter described. Inasmuch as the configuration of the various panels 21, 22, 23, and 24 may be identical and the connecting elements identical except as hereinafter noted, the structure proximate the joinder of panels 21 and 22 will be detailed hereinafter as exemplary.

Figure 2:
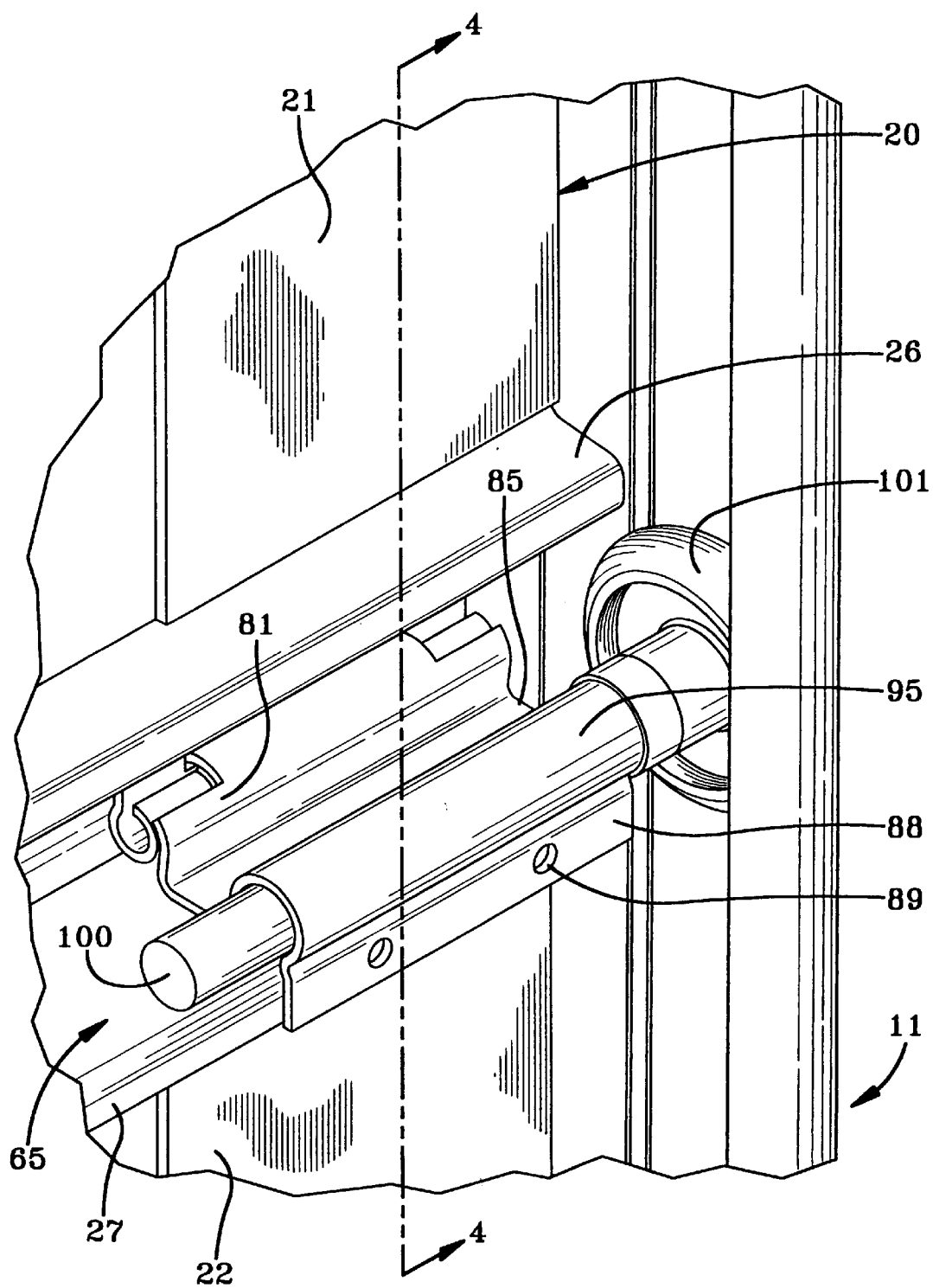
FIG. 2 is an enlarged perspective view depicting details of one of the hinges positioned to the right-hand side of the door of FIG. 1 and showing the interrelationship with the door panels which are interconnected by the hinge.
Figure 4:
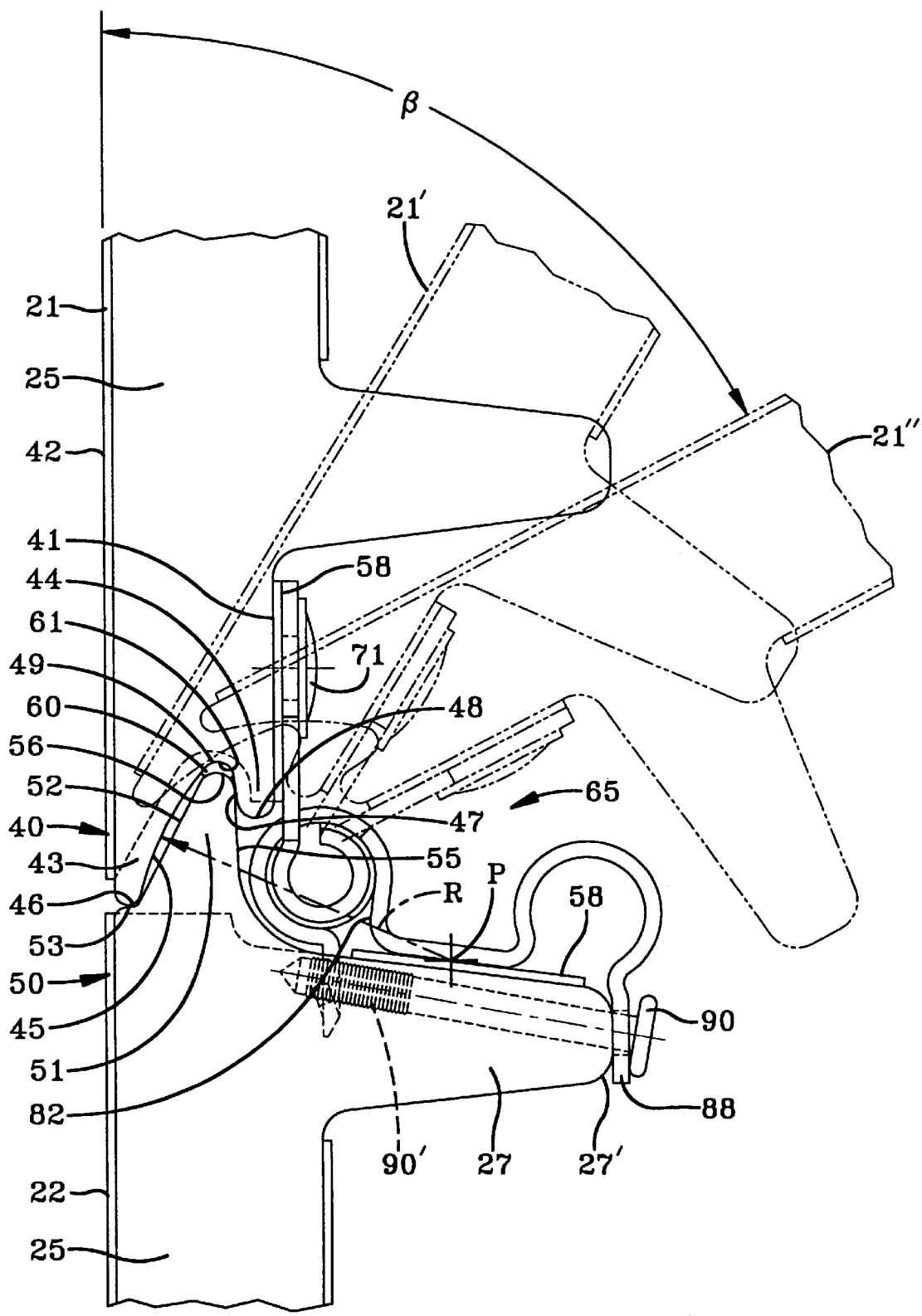
FIG. 4 is an enlarged fragmentary sectional view taken substantially along the line 4—4 of FIG. 2 of the hinge of the present invention shown in relation to the strut areas of the adjacent panels to which the hinges are mounted, with the door panels depicted in the vertical, planar position and shown at a position of maximum and intermediate deflection in chain lines.

Referring now to FIGS. 1, 2, and 4, it is to be noted that the panels 21 and 22, which are depicted for exemplary purposes, each have a body portion 25, which may be made of any of a wide variety of materials employed for sectional overhead doors. The body portions 25 may be all or partially of wood or may be of metallic or non-metallic sheet materials over a rigid foam or other laminate combinations. As shown, the panel 21 has an integrally formed, generally trapezoidal bottom rib or strut 26, and panel 22 has a similarly configured top rib or strut 27. The struts 26 and 27 serve as reinforcing members for effecting increased peripheral rigidity and beam strength and to assist in interconnecting the panels 21 and 22 in the instances of strut 27. Below the bottom strut 26 of panel 21, there is a bottom edge profile, generally indicated by the numeral 40. The bottom edge profile 40 extends the entire longitudinal length of the panel 21. Just below the bottom strut 26, the bottom edge profile 40 has an inner edge surface 41 and an outer edge surface 42 which are spaced a distance that may be substantially the same as the thickness of body portion 25 of panel 21.

The bottom edge profile 40 terminates in a pair of extending members in the form of outer finger 43 and inner finger 44. The outer finger 43 has the outer surface thereof defined by the outer edge surface 42. The inner surface of the outer finger 43 is a concave curvilinear surface 45 which may be circular and have the center of the arc or radius R defining surface 45 positioned at a point P, which lies a substantial distance inwardly of the body portion 25 of panels 21, 22. The outer finger 43 has a rounded extremity 46 which connects the outer edge surface 42 and the curvilinear surface 45.

The inner finger 44 may have as its inner surface the inner edge surface 41. The outer surface of finger 44 may be a substantially linear return surface 47. Inner finger 44 may also be provided with a rounded extremity 48 which joins the inner edge surface 41 and the return surface 47. The outer finger 43 and inner finger 44 have the concave surface 45 and the return surface 47 joined by a generally U-shaped receiver 49 constituting the inner boundary of the recess between fingers 43 and 44.

As depicted in FIG. 4, panel 22 has a top edge profile, generally indicated by the numeral 50, which is adapted to operatively pivotally interfit with the bottom edge profile 40. The top edge profile 50 includes an elongate projection 51, which is generally triangular in vertical cross-section. The projection 51 preferably has an outer planar surface 52, or, if desired, surface 52 may be slightly curved, such that it is somewhat convex. Outer planar surface 52 may advantageously be directed angularly inwardly and upwardly of body portion 25 of panel 22, such as to approximately constitute a chord of a circle centered on point P and passing through the extremities of surface 52. The outer planar surface 52 may be joined to outer surface 42 of body portion 25 by a short inset surface 53 which accommodates the rounded extremity 46 of outer finger 43 of bottom edge profile 40 in spaced relation when the door 20 is in the closed position depicted in FIG. 4 of the drawings.

The projection 51 is bounded interiorly of door 20 by an inner planar surface 55 which, as shown in FIG. 4, is directed substantially directly outwardly of top edge profile 50 of panel 22. Outer planar surface 52 and inner planar surface 55 of projection 51 are joined by a rounded extremity 56. The rounded extremity 56 moves into and out of proximity to the U-shaped receiver 49 of the bottom edge profile 40 during articulation of the panels 21 and 22. It is to be noted that the entirety of the outer planar surface 52 and the rounded extremity 56 of projection 51 lie in close proximity to curvilinear surface 45, rounded extremity 48, and return surface 47 of bottom edge profile 40 when the door 20 is in the closed position depicted in FIG. 4 of the drawings. Interiorly of the elongate projection 51 of top edge profile 50 is a hinge seating area 58, which is for a purpose described hereinafter. The hinge seating area 58 is a curving area continuing inner planar surface 55 and merging into the strut 27.

Interposed between the elongate projection 51 and the U-shaped receiver 49 is a sealing member 60. The sealing member 60 may be constructed of any of a variety of foam or other materials employed for weather sealing purposes. As shown, the sealing member 60 is an elongate strip which may have a somewhat semicircular side 61 to assist in its placement and retention in the U-shaped receiver 49 of bottom edge profile 40. The sealing member 60, when compressed by the elongate projection 51 and particularly the rounded extremity 56 thereof, serves to preclude the undesirable infiltration of water and air between the bottom edge profile 40 and the top edge profile 50.

The panels 21 and 22 are spaced and joined by a plurality of hinge assemblies, generally indicated by the numeral 65, as seen in FIGS. 1, 2, 4, 5, and 6. As best seen in FIG. 1, hinge assemblies 65 are located at the longitudinal extremity of the door panels 21, 22 for interaction with the track assemblies 11, 12, as hereinafter described. In addition, one or more similar hinge assemblies 65 may be intermittently positioned therebetween, depending upon the width of the door 20, the materials from which the door 20 is constructed, and related design considerations.

The hinge assemblies 65 each have a first hinge element 66 which is associated with bottom edge profile 40. The first hinge element 66 has a first leaf 67, which is a generally rectangular member having longitudinal ends 68 and 69. The first leaf 67 has a plurality of spaced attachment apertures 70. As shown in FIGS. 5 and 6, there are two apertures 70, with one aperture 70 being located proximate each of the ends 68, 69. The apertures 70 are adapted to receive fasteners 71 (see FIG. 4), which position and attach first hinge elements 66 to a bottom edge profile 40 and particularly inner edge surface 41 underlying the bottom strut 26. The fasteners 71 may be screws, bolts, rivets, or other elements, depending upon the material of the top panel 21, as is well known to persons skilled in the art.

The first leaf 67 of first hinge element 66 has at one longitudinal edge a first cylindrical knuckle 72. The first cylindrical knuckle 72 preferably extends the entire length of the first leaf 67 from end 68 to end 69. The first leaf 67 has a through slot 73 positioned proximate to the first cylindrical knuckle 72. As shown, the through slot 73 is generally rectangular and is spaced a distance from each of the ends 68 and 69 of the first leaf 67. The first cylindrical knuckle 72 advantageously is provided with a pair of raised cylindrical strips 74 and 75, which serve as bearing surfaces in a manner described hereinafter. The raised cylindrical strips 74 and 75 are preferably positioned longitudinally of the first cylindrical knuckle 72, such as to be spaced at a substantial distance but inwardly of the ends 76 and 77 of the through slot 73.

The hinge assemblies 65 also include a second hinge element 80 which is affixed to the upper middle panel 22 and interengages with the first hinge element 66 to provide the requisite pivotal connection. The second hinge element 80 has a second cylindrical knuckle 81 which is preferably of substantially the same axial extent as first cylindrical knuckle 72. The second cylindrical knuckle 81 has an inner diameter 82 which is slightly greater than the outer diameter 76 of the first cylindrical knuckle 72. In this manner, the second cylindrical knuckle 81 is configured to rotate about the outer diameter 76 of first cylindrical knuckle 72 to form interlocking hinge elements which do not require a hinge pin. The previously described raised cylindrical strips 74 and 75 are adapted to engage and serve as spaced bearing surfaces for the inner diameter 82 of the second cylindrical knuckle 81. The second cylindrical knuckle 81 has a tongue 83 over a portion of its circumferential extent. The tongue 83 is of a longitudinal extent slightly less than the longitudinal extent of the through slot 73 in first leaf 67, such that the tongue 83 extends into the through slot 73 and overlies a portion of the first cylindrical knuckle 72 of the first hinge element 66. The second cylindrical knuckle 81 forms lateral support members 84 in the remainder of the second cylindrical knuckle 81 which is not occupied by the tongue 83. As shown, the support members 84 extend longitudinally outwardly of the tongue 83 and, as shown, preferably extend substantially to the same longitudinal dimension as the longitudinal extent of first cylindrical knuckle 72. The second cylindrical knuckle 81 adjacent the support members 84 in the direction opposite the tongue 83 merges into a second leaf 85 consisting of a generally rectangular surface 86, which is preferably of substantially the same longitudinal extent as second cylindrical knuckle 81. The surface 86 of second leaf 85 is adapted to seat against the top strut 27 proximate the top edge profile 50. The second cylindrical knuckle 81 of the second hinge element 80 reposes in the hinge seating area 58 of the top edge profile 50.

The second hinge element 80 is attached to the upper middle panel 22 to effect the articulation necessary between the panels 21 and 22. In particular, the second leaf 85 has a flange 88 which is disposed at an angle, such as to overlie the inner extremity 27' of top strut 27 of upper middle panel 22 (see FIG. 4). The flange 88 has a pair of bores 89 for receiving fasteners 90. The fasteners 90 extend into the top strut 27 and engage a pair of projecting tabs 91 which extend angularly from the extremity of the tongue 83 of the second cylindrical knuckle 81. The tabs 91 may be provided with bores 92 for receiving the fasteners 90 which may have a threaded portion 90' for engagement therewith.

It will thus be appreciated that the fasteners 90, which may be screws, bolts, rivets, or other specialty connecting devices, extend through the inner extremity 27' and parallel a side of the top strut 27 to provide a firm, spaced interconnection with flange 88 and tabs 91 of the second hinge element 80.

The planar surface 86 of the second leaf 85 of second hinge element 80 are discontinuous to accommodate the formation of a cylindrical sleeve 95. As best seen in FIG. 2, the cylindrical sleeve 95 supports a shaft 100. In conventional fashion, shaft 100 mounts a roller 101 which interengages track assembly 11 as seen in FIG. 2. The cylindrical sleeve 95 may be variously positioned laterally of the second leaf 85 (FIG. 4), depending upon the standoff distance required for a particular hinge assembly 65 due to its positioning on the sectional door 20. In particular, the standoff distance between a particular roller 101 and the adjacent floor panels must provide for closure of the sectional door 20 against the door frame F when the sectional door 20 is in the closed, vertical position. The standoff distance variation is, of course, occasioned by the angular inclination of the vertical track sections 13 relative to the door frame F. Thus, a substantial standoff distance is noted in positioning of the cylindrical sleeve 95 where a hinge assembly 65 is designed for the juncture between panels 21 and 22. Progressively lesser standoff distances are necessarily required between the panels 22 and 23 and panels 23 and 24.

The hinge assembly 65 depicted in FIGS. 5 and 6 is exemplary of a standoff distance positioning as might exist between the panels 22 and 23 wherein the cylindrical sleeve 95 is positioned in closer proximity to the second cylindrical knuckle 81 than that depicted in FIGS. 2 and 4. It will be appreciated that all hinges assemblies 65 for a sectional door 20 may be identical except for the positioning of the cylindrical sleeve 95 laterally of second leaf 85, depending upon the positioning as between door panels and the particular characteristics of the door panels, the door frame F, and the track assemblies 11, 12.

Referring now to FIGS. 3 and 4, it will be appreciated that the panel edge profiles 40, 50, together with the hinge assemblies 65, provide for angular displacement between adjacent panels 21 and 22 when moving from vertical track sections 13 to horizontal track sections 15 through transition track sections 14 through a maximum angle β of approximately 70 degrees from the 0 degree angle existing when adjacent panels are in planar alignment. The position of essentially maximum angularity where the angle β is at its maximum 70 degrees is depicted in FIG. 3 of the drawings. The planar aligned position of adjacent panels 21 and 22 where the angle β is equal to 0 is depicted in solid lines in FIG. 4, with top panel 21 positioned co-planar with upper middle panel 22. During articulation of the panels, the top panel 21 moves through an intermediate position depicted in chain lines as 21' to a position of maximum angularity, with the angle β being equal to approximately 70 degrees as depicted in chain lines at 21".

It is significant to note that the configuration of the panel edge profiles 40, 50 and hinge assemblies 65, together with their placement and operating interrelationship, serve to provide the anti-pinch feature of the instant system. As may be particularly noted from FIG. 4, the rounded extremity 46 of outer finger 43 of the bottom edge profile 40 remains in close proximity through the full extent of angular movement between panels 21 and 22, with the top edge profile 50 and particularly either the outer planar surface 52 or rounded extremity 56 of the elongate projection 51. In a dimensional sense, this proximity may be readily controlled to at all times remain within a distance of approximately 2 inch, such that a person's fingers cannot be inserted between the bottom edge profile 40 and the top edge profile 50 at any time during operational movement of sectional door 20.

Referring now to FIGS. 1 and 7 of the drawings, the lower corners of the bottom panel 24 of the sectional door 20 each carry a bracket and roller assembly, generally indicated by the numeral 110. For exemplary purposes, the bracket and roller assembly 110 at the lower left-hand corner of the sectional door 20 depicted in FIG. 1 is shown in detail in FIG. 7A. The bracket and roller assembly 110 includes an L-shaped plate 111 which is located near the bottom edge 35 of the sectional door 20. It will be appreciated by persons skilled in the art that the bottom edge 35 may have any of a variety of astragal configurations attached to it for purposes of effecting sealing and meeting other operational requirements.

The bottom panel 24 may also have an inner surface 36 and a side edge 37. The L-shaped plate 111 has a first leg 112 which overlies the inner surface 36 of the sectional door 20. A second leg 113 of L-shaped plate 111 overlies the side edge 37 of sectional door 20. As shown, the second leg 113 carries a projecting knob 114 which is adapted to anchor or otherwise secure the extremity of a cable C. The cable C interconnects with the counterbalance system (not shown) for the sectional door 20. In particular, the cable C is normally reeved about a pulley (not shown) at the upper corner of the door frame F and is operatively interrelated with tension members, such as to provide increasing counterbalancing forces to the sectional door 20 through the bottom panel 24 as the sectional door 20 is lowered to the closed, vertical position depicted in FIG. 1.

As shown, the first leg 112 of the L-shaped plate 111 may be positioned below bottom strut 26 of the bottom panel 24 in order that all of the panels 21, 22, 23, and 24 may be of the same structural configuration, if desired. The L-shaped plate 111 is attached to the panel inner surface 36 by a pair of fasteners 115 that pass through bores 116, which may be threaded strategically positioned in the first leg 112 and extending into the bottom panel 24. The fasteners 115 may be screws, bolts, or other appropriate connecting members, depending upon the material from which a particular sectional door 20 is constructed. Formed integrally with or attached, as by welds (not shown), to the L-shaped plate 111 is a cylindrical sleeve 120, which is adapted to receive a conventional shaft 121 mounting a roller 122 for engagement with track assembly 12. The cylindrical sleeve 120 has a pair of cutouts 125 which penetrate the entire thickness of the cylindrical sleeve 120, such that at least a portion of the shaft 121 extends therethrough.

The bores 116 and the sleeve 120 are juxtapositioned on the first leg 112 of L-shaped plate 111 according to a particular relationship. Specifically, the fasteners 115 may be removed by passing through the cutouts 125 in the sleeve 120 when the shaft 121 is not positioned in the sleeve 120. However, when the shaft 121 carrying roller 122 is positioned in sleeve 120, removal of the fasteners 115 is not possible due to interference with the portions of shaft 121 located in the cutouts 125. This arrangement permits installation of the bracket and roller assembly 110 in positions of the sectional door 20 where the cable C is not under tension; however, it precludes the possibility for removal of the fasteners 115 in the closed, vertical position of the sectional door 20 or other locations where the cable C is tensioned because the roller 122 and attached shaft 121 cannot be removed from the sleeve 120 in those locations. It will be observed that, as shown, the cutouts 125 are in effect a cylindrical notch segment in the sleeve 120, based upon a cut made perpendicular to the first leg 112 of L-shaped plate 111, with the notch having a diameter slightly greater than the heads of fasteners 115 and positioned substantially concentric therewith.

Additional details of a preferred structure for the panels 21, 22, 23, and 24 are shown in FIGS. 8 and 9 A of the drawings. Inasmuch as the hinge assemblies 65 and other hardware are adapted to fit the basic door panel configuration shown herein, all door panels may be identical, such that door panel 22 is hereinafter described for exemplary purposes.

The panel 22 has a foam core 140 which is of a generally rectangular configuration, except for variations that are noted hereinafter. The foam core 140 is preferably a low-density, rigid foam of any of a wide variety of compositions well known in the industry. The foam core 140 is constructed of an appropriate synthetic resin, such as polyurethane foam, for purposes of achieving both strength and insulating characteristics. The foam core 140 may be in the nature of a precut, foamed insert or may be foamed in place according to techniques known in the art. The panel 22 has a front surface, generally indicated by the numeral 141, which is defined by an outer skin 142. The outer skin 142 is preferably constructed of a light-gauge, high-strength steel, which may be processed in a manner to resist exposure to the elements in a manner known to persons skilled in the art.

The outer skin 142 preferably extends the full longitudinal and lateral extent of front surface 141 of panel 22. In addition, the skin 142 preferably extends about and defines the outer surfaces of top edge profile 50 and bottom edge profile 40. The skin 142 also preferably continues to define the generally trapezoidal bottom rib or strut 26 and the top rib or strut 27 of panel 22. The skin 142 preferably terminates laterally inwardly of each of the struts 26, 27 in spaced flanges 143 and 144. The top and bottom edge profiles 40, 50 and struts 26,27 are preferably interiorly filled by the foam core 140.

The door panel 22 has as a portion of an inner surface, generally indicated by the numeral 145, an inner skin 146, which extends between flanges 143, 144 the longitudinal length of panel 22. The skin 146 preferably has lateral extremities 147 and 148 which advantageously overlap and, as shown, underlie the flanges 143 and 144, respectively. The inner skin 146 may be made of treated paper, metallic-coated paper, non-metallic sheet material, or metallic sheet of types which are known in the art.

The inner surface 145 has a medial recess, generally indicated by the numeral 150, which is preferably centered laterally, substantially medially of panel 22 in the inner skin 146 and the foam core 140. As shown in FIG. 9A, the recess 150 extends approximately one-half of the distance from the center of panel 22 to each edge profile 40, 50. The inner surface 145 has offsets 151 and 152 which transcend from full-thickness sections 140' to a reduced-thickness section 140" of foam core 140. It has been determined that reduced-thickness section 140" can be as thin as approximately 0.25" while maintaining the desired stiffness, sound-deadening, and insulating properties of the door panel 22 as a whole in an air environment. It will, of course, be appreciated that the offsets 151 and 152 contribute to increasing the rigidity of the panel 22. It will further be appreciated by persons skilled in the art that full-thickness sections 140' and reduced-thickness section 140" of foam core 140 may be varied in thickness as required to meet insulation, sound-deadening, or stiffness requirements for a particular door design. As seen in FIG. 9A, the offsets 151, 152 may be relatively steeply inclined in that they are positioned at an angle of approximately 60 degrees to a line perpendicular to the reduced-thickness surface 153 of recess 150. With the structural arrangement shown in FIG. 9A, the quantity of foam for the foam core 140 can be reduced on the order of 30 to 40 percent of that required for a conventional rectangular foam core without significantly adversely affecting the characteristics of the panel 22 as noted hereinabove.

As seen in FIG. 8, the panel 22 may be provided with end caps 155 which overlie the ends of foam core 140 and the longitudinal extremities of outer skin 142 and inner skin 146. If desired, spaced stiles or muttons may be provided at one or more positions longitudinally of the door panel 22.

A modified door panel 222 is depicted in FIG. 9B of the drawings. The panel 222 is configured the same as the panel 22 of FIG. 9A, except for medial recess, generally indicated by the numeral 250, in the inner surface 245. As shown, the recess 250 extends approximately one-half of the distance from the center of panel 22 to each of the edge profiles in a manner comparable to recess 150. The inner surface 245 has offsets 251 and 252 which transcend from full-thickness sections 240' to a reduced-thickness section 240" of foam core 240. In a manner similar to the panel 22, it has been determined that reduced-thickness section 240" can be as thin as approximately 0.25" while maintaining the desired stiffness, sound-deadening, and insulating properties of the door panel 222 as a whole in an air environment. It will be appreciated that the offsets 251 and 252 contribute, to some measure, to increasing the rigidity of the panel 222, although less steeply inclined than the offsets 151, 152. The possibilities of varying the thickness of full-thickness sections 240' and reduced-thickness section 240" of foam core 240 are, of course, available to satisfy requirements for a particular door design. The panel 222 can produce a foam quantity reduction on the order of 30 to 40 percent without significantly adversely affecting the stiffness, sound-deadening, and insulating properties of the panel 222.

Another modified door panel 322 is depicted in FIG. 9C of the drawings. The panel 322 is configured the same as the panels 22 and 222 of FIGS. 9A and 9B, except for medial recess, generally indicated by the numeral 350, in the inner surface 345. In this instance, the recess 350 is in the form of a gradual curve, which extends substantially the entire width of the inner surface 345 to create a concave configuration. Here, the foam core 340 has a minimum-thickness portion 340" substantially medially of the transverse width of inner surface 345 with tapering, progressively thicker sections 340' to either side thereof. The possibilities of varying the thickness dimensions of foam core 340 and achieving a foam quantity reduction, as discussed in relation to panel 22 and 222 are, are equally applicable.

From the discussion involving panels 22, 222, and 322, it will be appreciated that innumerable geometric configurations by way of combinations of curved and linear surfaces could be employed to achieve foam reduction without substantially compromising specifications by the incorporation of a recess or recesses in the inner surface of a door panel.

Exemplary curing oven equipment in the form of a conveyor system for manufacturing panel material 22' for panels 22 according to the invention is generally indicated by the numeral 400 in FIGS. 10–15 of the drawings. The conveyor system 400 permits continuous panel production by effecting pressurized support of panel material 22', configured such as panel 22 of FIG. 9A, during the expansion and bonding of the internal foam core 140 in an oven, until such time as it becomes substantially set in the final configuration prior to the panel material 22' being cut to length in a manner well known in the art.

The conveyor system 400 includes a lower conveyor assembly, generally indicated by the numeral 401, and an upper conveyor assembly, generally indicated by the numeral 402. The conveyor assemblies 401 and 402 are selectively adjusted as hereinafter described to permit the passage of panel material 22' therebetween, as seen in FIG. 11 of the drawings.

Figure 11:
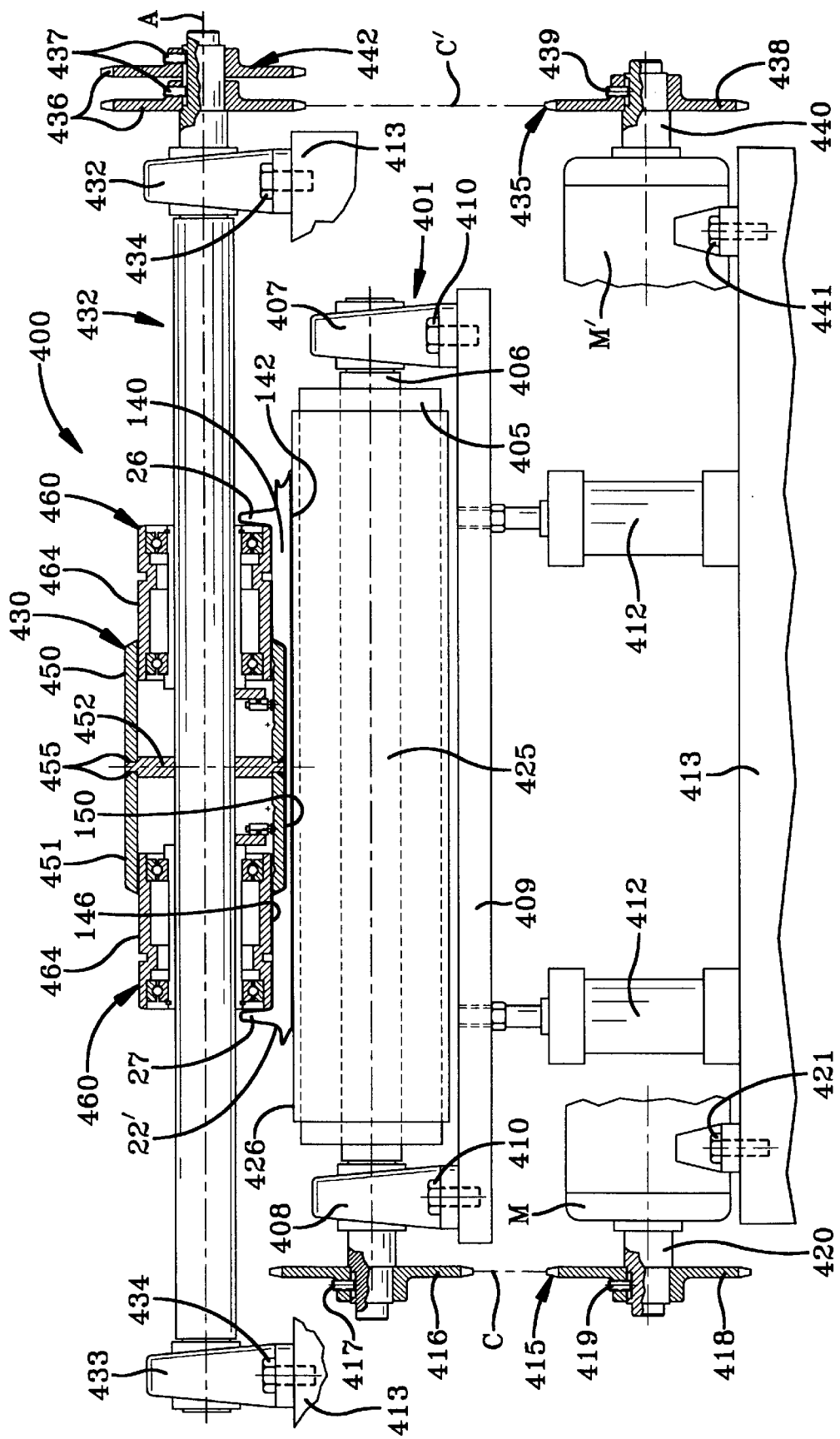
FIG. 11 is an end elevational view, with portions in section, depicting a lower conveyor and an upper conveyor constituting the arrangement of the conveyor system of FIG. 10, including the drive motors for the conveyor rollers.

Referring particularly to FIG. 11 of the drawings, the lower conveyor assembly 401 consists of an extended line of identical rollers 405 which have a lateral width exceeding the widest panel 22 to be processed in conveyor system 400. Depending upon the speed at which panel material 22' is introduced to the conveyor system 400, the time required for the foam core 140 to expand and set, and related considerations, appropriate lengths of lower conveyor assembly 401 may consist of several dozen lower rollers 405 or more.

Each of the lower rollers 405 is affixed to a shaft 406 mounted in spaced pillow blocks 407 and 408. The pillow blocks 407, 408 are attached to a movable frame 409 as by suitable machine screws 410. The movable frame 409 is supported by a plurality of cylinders 412 which are mounted on a fixed frame 413. Actuation of the cylinders 412 permits positioning of the lower conveyor assembly 401, and particularly the lower rollers 405, vertically relative to the upper conveyor assembly 402, as seen in FIG. 11, to vary the spacing therebetween and thus accommodate panel material 22' of differing thickness.

The lower conveyor assembly 401 has the lower rollers 405 powered by a lower conveyor drive assembly, generally indicated by the numeral 415. Lower conveyor drive assembly 415 includes a driven sprocket 416 which is non-rotatably affixed to the shaft 406 of roller 405 as by a set screw 417. A drive chain C may be employed to connect the driven sprocket 416 with a drive sprocket 418 of the lower conveyor drive assembly 415. The drive sprocket 418 is affixed by a set screw 419 to a shaft 420 of a drive motor M, which may be attached to the fixed frame 413 as by machine screws 421. It will thus be appreciated that by suitable adjustment of the speed of motor M, the rollers 405 may be driven at any desired speed and preferably at substantially the velocity of panel material 22' entering the conveyor system 400. As will be apparent to persons skilled in the art, all or merely some of the rollers 405 of lower conveyor assembly 401 may be driven by a chain drive and sprockets interconnecting the various shafts 406 (not shown).

The lower conveyor assembly 401, by virtue of rollers 405, provides a co-planar upper surface which engages the planar outer skin 142 of panel material 22' to resist foaming pressure internally of panel material 22' passing through conveyor system 400 during the manufacturing process. If desired, the rollers 405 may carry a conveyor belt 425 which has an upper planar surface 426 for directly engaging the outer skin 142 of panel material 22' to assist in the distribution of forces from the lower conveyor assembly 401 to the panels 22.

Figure 10:
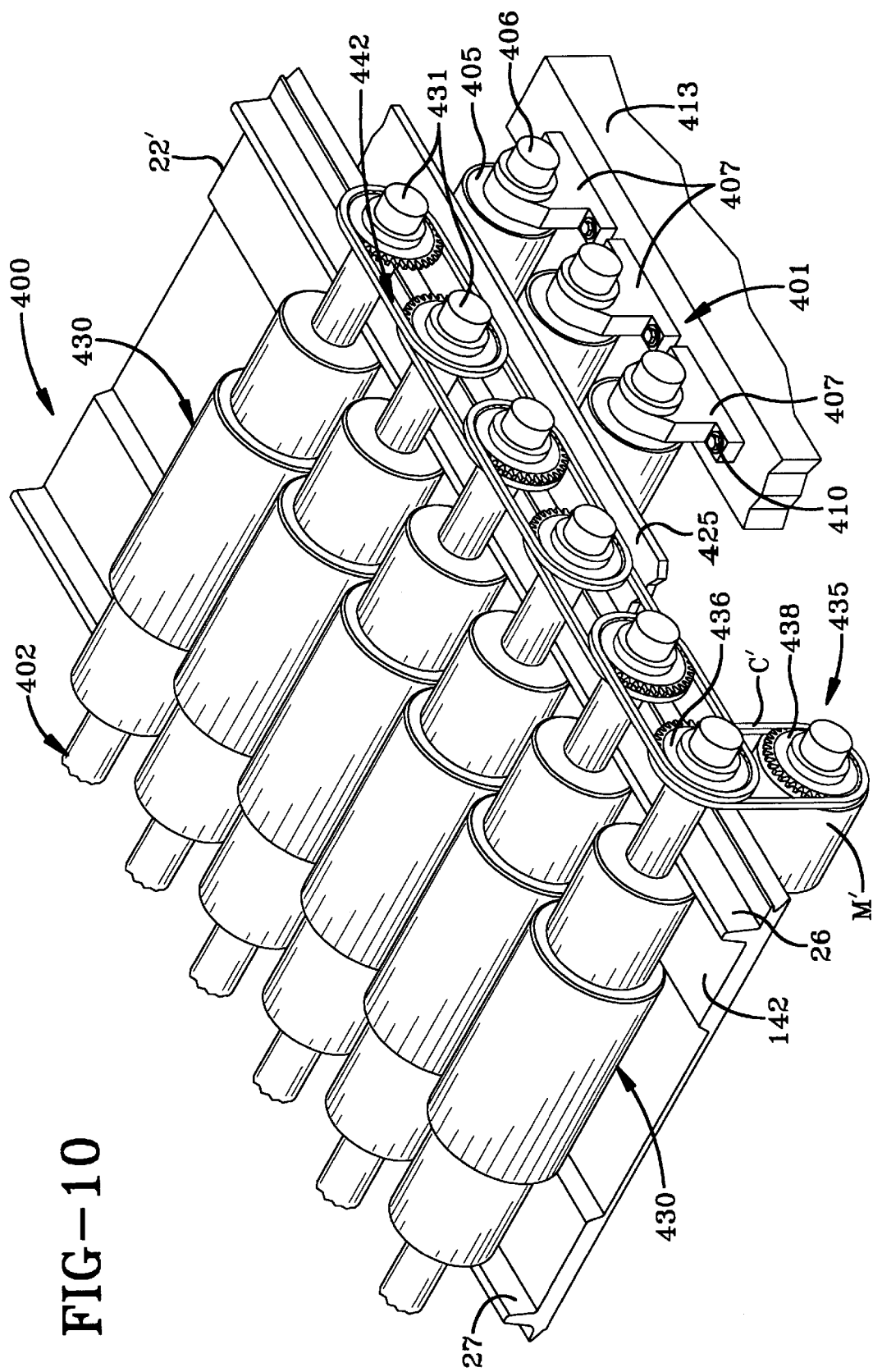
FIG. 10 is a fragmentary perspective view of a conveyor system according to the concepts of the present invention for curing oven equipment for making sectional door panels shown in operative relation to an exemplary foam-cored door panel being fabricated to a configuration according to the present invention.

The upper conveyor assembly 402 is positioned in operative relation to the lower conveyor assembly 401 and particularly panel material 22' reposing on the upper surface thereof. As best seen in FIGS. 10 and 11, the upper conveyor assembly 402 consists of a plurality of spaced but proximate upper rollers, generally indicated by the numeral 430. The rollers 430 are each mounted on shafts 431 having parallel axes A such that the rollers 430 are in close but spaced juxtaposition, as schematically depicted in FIG. 10. Referring now to FIG. 11, each of the shafts 431 is mounted in spaced pillow blocks 432 and 433. The pillow blocks 432 and 433 are attached to a portion of the fixed frame 413 of conveyor system 400 as by suitable machine screws 434. The shafts 431 thus remain fixed in the conveyor system 400 but free to rotate in the pillow blocks 432 and 433.

The upper conveyor assembly 402 includes an upper conveyor drive assembly, generally indicated by the numeral 435. The upper conveyor drive assembly 435 includes driven sprockets 436, 436 which are non-rotatably affixed to shaft 431 of roller 430 as by set screws 437,437. A drive chain C' may be employed to connect the driven sprocket 436 with a drive sprocket 438 of the upper conveyor drive assembly 435. The drive sprocket 438 is affixed by a set screw 439 to a shaft 440 of a drive motor M', which may also be attached to the fixed frame 413 as by machine screws 441. It will thus be appreciated that by suitable adjustment of the speed of motor M', the rollers 430 may be driven at any desired speed and preferably at substantially the velocity of panel material 22' entering the conveyor system 400 and at substantially the velocity of the rollers 405 of lower conveyor assembly 401. In a manner similar to the rollers 405, all or merely some of the rollers 430 of the upper conveyor assembly 402 may be driven by the upper conveyor drive assembly 435, as by conventional sprockets and an interconnecting chain, generally indicated by the numeral 442.

As can be best seen in FIGS. 11 and 13–15, the upper rollers 430 are specially constructed, as contrasted with the conventional cylindrical configuration of the lower conveyor rollers 405, such that rollers 430 engage the inner skin 146 of panel material 22' from a position just inwardly of the struts 26 and 27 of panels 22 (see FIGS. 10 and 11). The upper rollers 430 have a center drum, generally indicated by the numeral 450, having an outer surface 451 which engages the medial recess 150 in the inner skin 146 of a door panel 22. The panels 22 are preferably constructed such that the medial recess 150 is of the same lateral extent in all panels 22, irrespective of the overall lateral dimension or thickness of a particular panel 22. The center drum 450 may be fabricated from a narrow central hub 452 which is press fit on the shaft 431, preferably medially thereof, and which spaces and joins a pair of elongate annular elements 453 and 454 as by suitable welds 455. The center drum 450 thus has cylindrical openings interiorly of the annular elements 453 and 454 extending from the axial extremities thereof to the central hub 452, all of which rotate with the shaft 431. The outside diameter of the drum 450, as defined by outer surface 451, may conveniently be of substantially the same diameter as the lower conveyor rollers 405.

Figure 15:
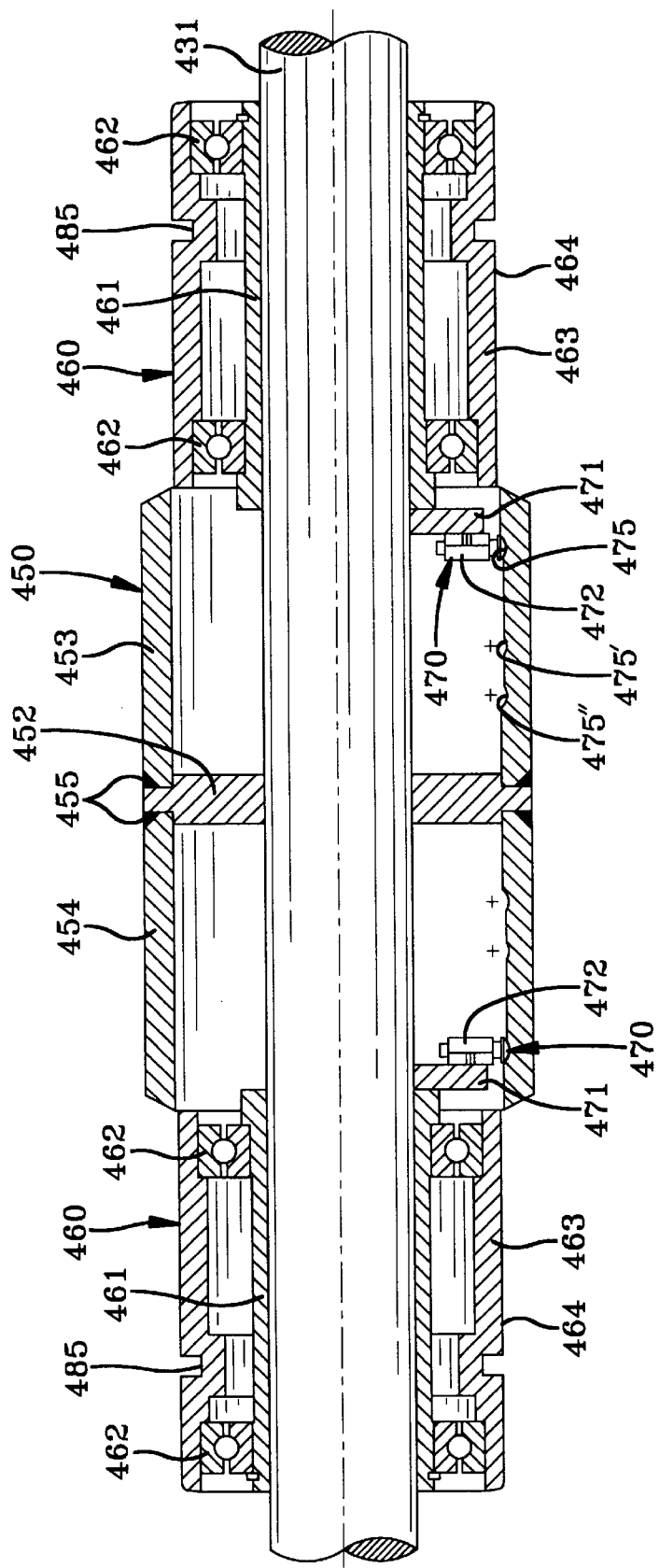
FIG. 15 is an enlarged cross-sectional view of an upper conveyor roller as depicted in FIGS. 10–15.

The annular center drum 450 of upper rollers 430 has side drums, generally indicated by the numeral 460, positioned laterally to either side thereof. As can be seen particularly in FIGS. 11 and 15, the side drums 460 telescope into the cylindrical openings formed by the elongate annular elements 453 and 454 of the center drum 450. The side drums 460 each have an inner sleeve 461 which is sized to fit over the shaft 431 of the upper conveyor assembly 402, as best seen in FIG. 15. On the outer surface of each sleeve 461 at each axial extremity thereof, there is a bearing race 462 that supports an outer sleeve 463, which is thus freely rotatably mounted relative to both the shaft 431 and the inner sleeve 461. The outer sleeves 463 thus have outer surfaces 464 adapted to engage the inner skin 146 of panel 22 in the two co-planar areas between each of the struts 26 and 27 and the medial recess 150 to apply pressure thereto during expansion of the foam core 140 of panel material 22'. The outer sleeves 463 are freely rotatable to assume a tangential velocity at the surfaces 464 identical to the velocity of the inner skin 146 of panel material 22' in engagement therewith to thus preclude the scrubbing or pulling which would otherwise occur due to the differing tangential velocity.

In order to accommodate door panel material 22' of differing widths, which are necessary to provide sectional doors of differing heights, the side drums 460 may be adjustably positioned laterally or axially of center drum 450. In this manner, all different panel sizes may have the same configuration laterally outwardly of the struts 26 and 27 and in terms of the width of the medial recess 150 engaged by the center drum 450, with the differences in panel width being accounted for exclusively in the lateral extent of the inner skin surfaces 146 engaged by the side drums 460, as can be appreciated from FIG. 11.

Figure 13:
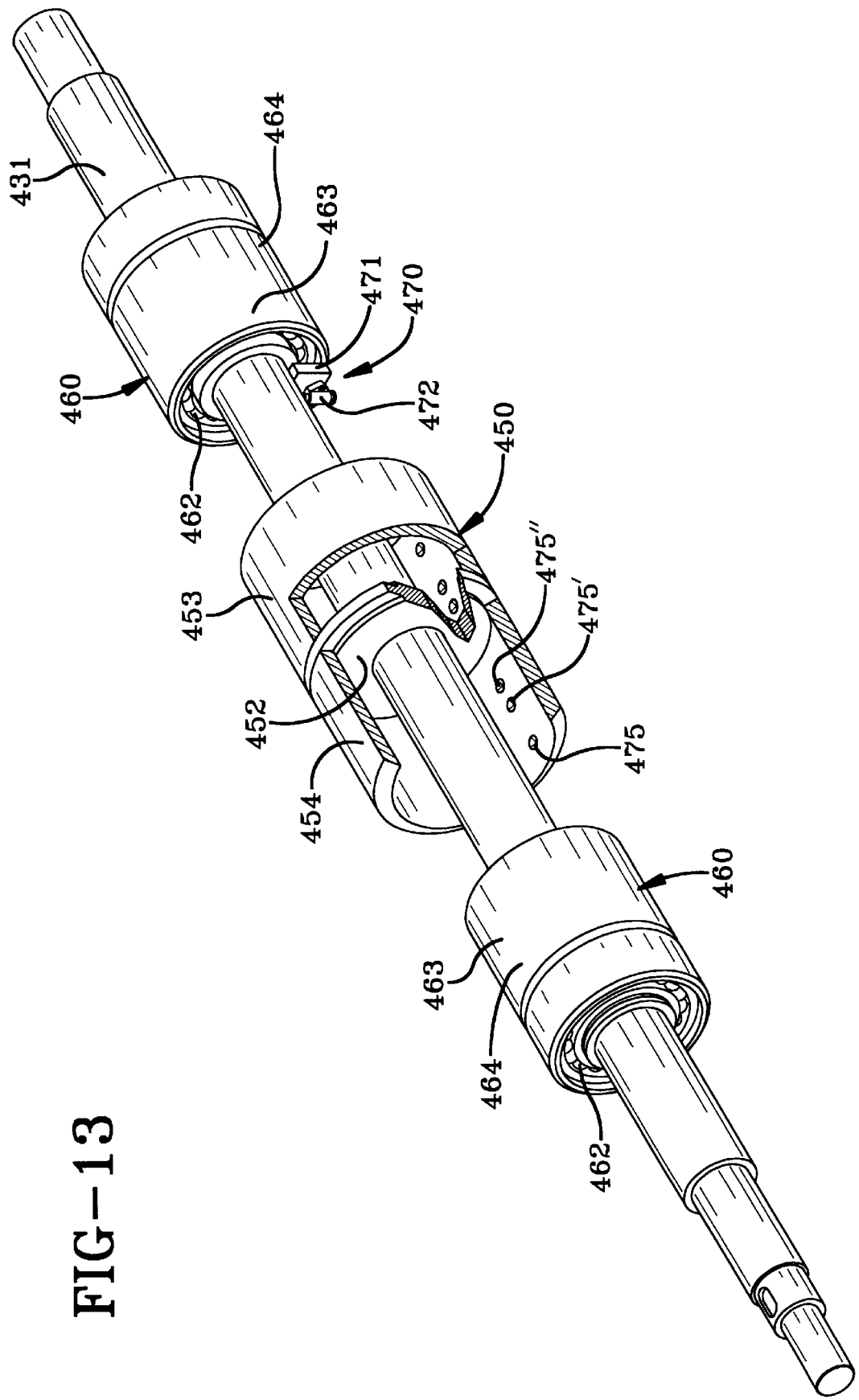
FIG. 13 is an exploded view of an upper conveyor roller of FIG. 10 with portions broken away to depict the structure for maintaining the positioning of the sleeves defining the lateral extent thereof.
Figure 14:
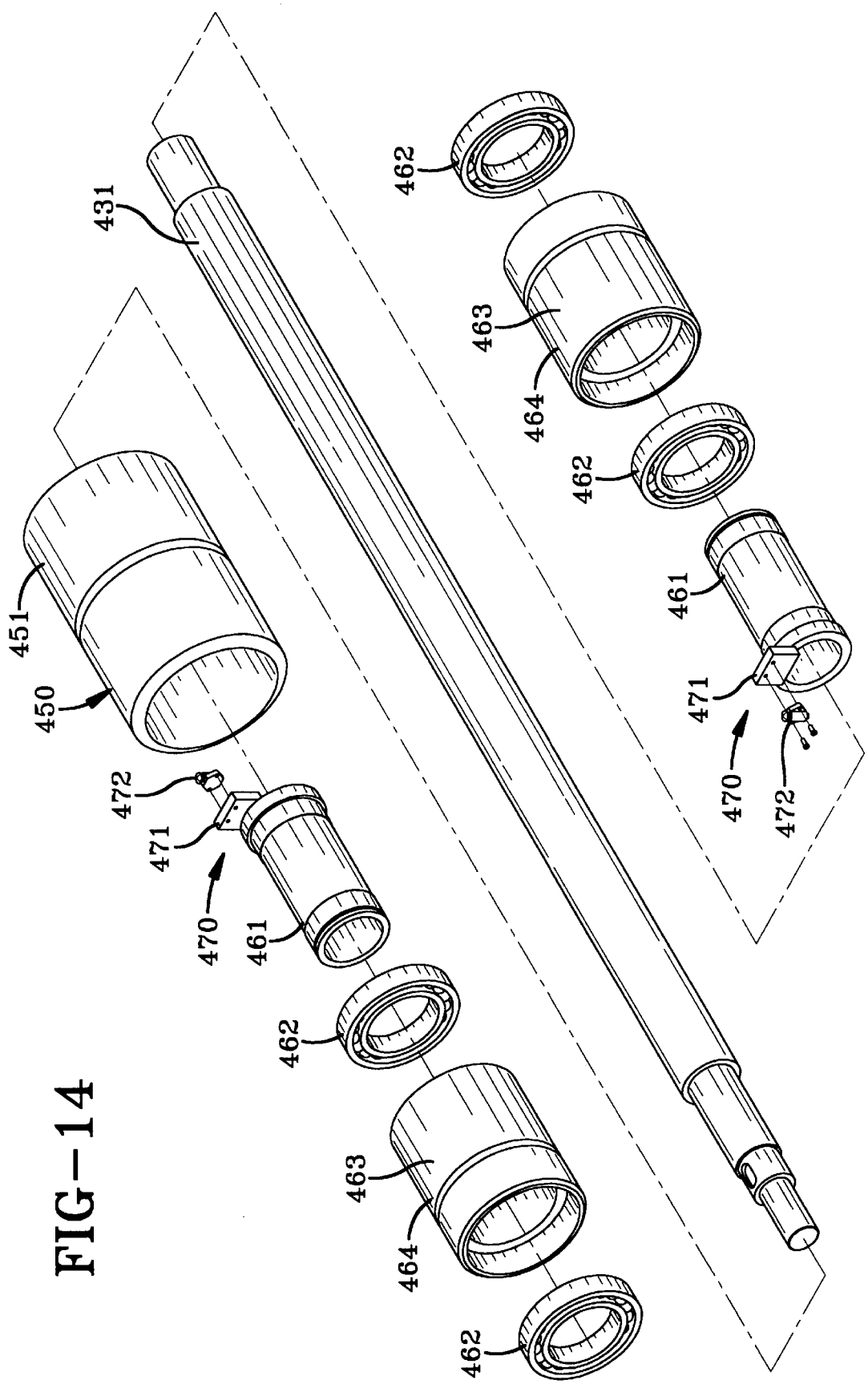
FIG. 14 is a fully exploded view of the upper conveyor roller of FIG. 13 showing structural details of the individual components thereof.

The lateral adjustment of the side drums 460 relative to the center drum 450 is effected by the outer surfaces 464 of outer sleeves 463 telescoping differing distances within the annular elements 453 and 454 of center drum 450. A plurality of preselected positions of the side drums 460 laterally of the center drum 450 are achieved by position retaining assemblies, generally indicated by the numeral 470. The position retaining assemblies 470, as best seen in FIGS. 13–15, each have a detent tab 471 mounted at the lateral end of the inner sleeves 461, which telescope within the center drum 450. Each detent tab 471 mounts a spring-loaded detent 472 which projects radially outwardly of the side drums 460 and extends outwardly thereof a sufficient distance to engage the inner surface of the elongate annular elements 453 and 454 of the center drum 450. The inner surfaces of the annular elements 453 and 454 of center drum 450 have a plurality of detent receiving bores 475, with three exemplary bores 475, 475', 475", being depicted in FIG. 13. With the detent receiving bores 475, 475', and 475", there is provision for three different widths of panel 22, depending upon which of the bores the spring-loaded detents 472 are engaging. It is to be appreciated that more or less of the detent receiving bores 475 may be provided, and they can be located axially of the annular elements 453, 454 of center drum 450 as necessary to operate as hereinabove described with respect to a particular lateral dimension of a panel 22.

The position retaining assemblies 470 maintain side drums 460 at a desired position as long as panels 22 of a given lateral dimension are to be run on the conveyor system 400. When it is desired to run panels 22 of a different lateral dimension or width, each side drum 460 of each of the upper rollers 430 must be adjusted to one of the detent receiving bores 475, 475', or 475" appropriate to achieve the correct lateral dimension of the upper rollers 430. This may be accomplished manually by grasping and physically moving each of the side drums 460 of each of the rollers 430, since the spring-loaded detents 472 retract sufficiently to be moved upon the application of a displacing force.

Figure 12:
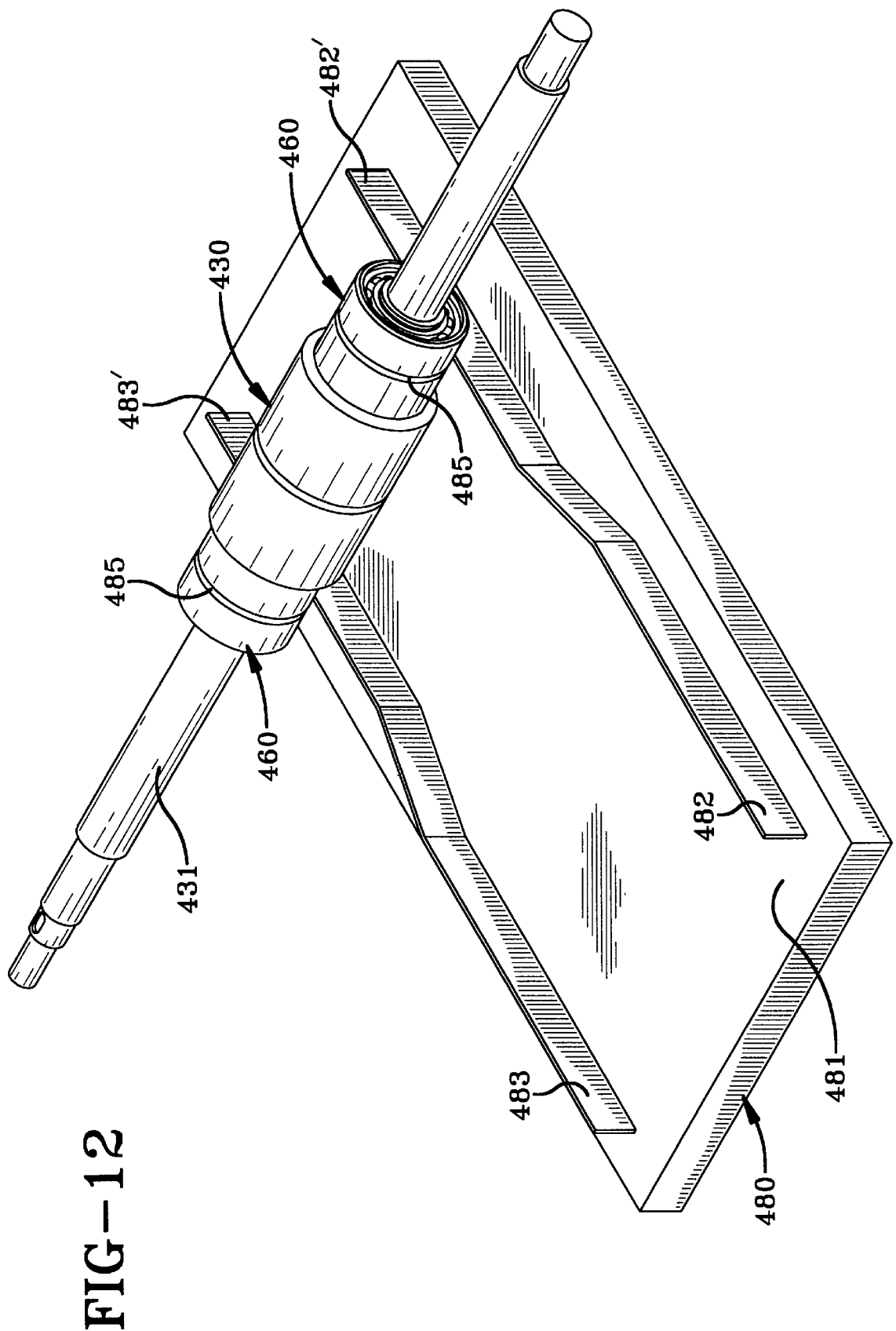
FIG. 12 is a fragmentary perspective view of a single upper conveyor roller shown in operative relation to derailer tooling for adjusting the lateral extent of the rollers of the upper conveyor of the conveyor system of FIG. 10.

The adjustment of the side drums 460 can, however, be quickly and automatically effected by use of a derailer, generally indicated by the numeral 480 in FIGS. 12 and 12A. As best seen in FIG. 12, the derailer 480 consists of a rectangular block 481 having dimensions generally comparable to a panel 22. One side of the block 481 has projecting parallel strips 482 and 483 which are adapted to engage circumferential grooves 485 (see FIG. 15) in the outer surface 464 of the side drums 460. As best seen in FIG. 12, the upper conveyor roller 430 has grooves 485 engaging strips 482 and 483 in narrowly displaced areas of the strips 482' and 483', as contrasted with the wider spacing at 482 and 483. Intermittent these areas, the strips 482, 483 have a non-parallel converging or diverging section to transcend between the narrower and wider areas of the strips 482, 483.

The derailer 480 is shown in operation in FIG. 12A where it is depicted being fed into the conveyor system 400 between the lower conveyor assembly 401 and the upper conveyor assembly 402. When the conveyor system 400 is driven in the normal fashion, the derailer 480 moves from left to right through conveyor system 400, as seen in FIG. 12A. In the illustrated instance, the upper rollers 430 are moved from the narrower positioning of the strips 482', 483' to the wider position at 482, 483, as the outward displacement of the groove 485, in passing through the diverging area of strips 482, 483, moves the spring-loaded detents 472 from a laterally inner to a laterally outer position, where a different detent receiving bore 475 is engaged to thus lock the side drums 460 in the new position. It will be appreciated that the travel of the derailer 480 through the entire length of the conveyor system 400 will effect adjustment of all of the upper conveyor rollers 430. It will also be understood that with the use of a plurality of derailers 480 having strategically located and configured strips 482, 483, the automated movement from any width of roller 430 to any other width can be accomplished merely by stopping the conveyor system 400, passing an appropriate derailer 480 through the length of the conveyor system 400, and then resuming operation of conveyor system 400 in the processing of panels 22 of a different width.

Figure 16:
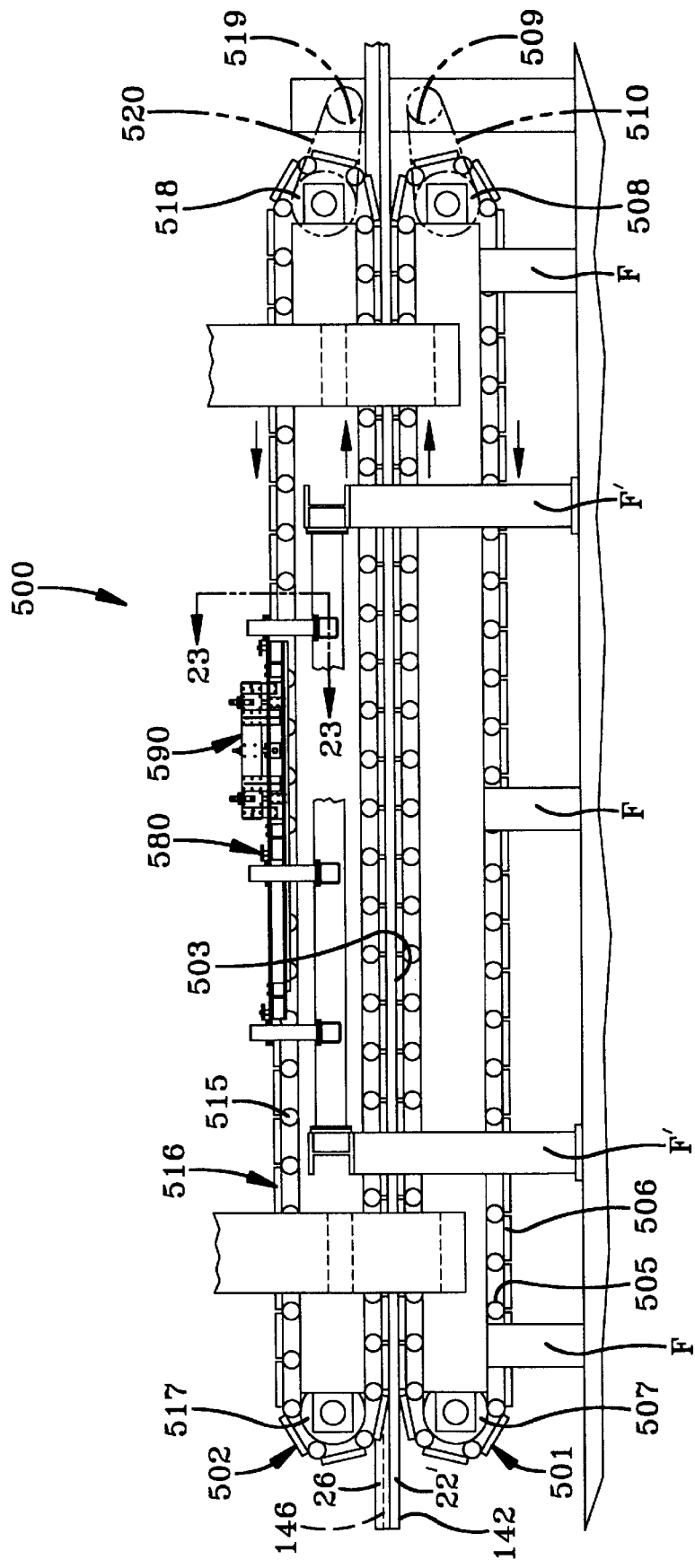
FIG. 16 is a fragmentary side-elevational view of an alternate conveyor system according to the concepts of the present invention for curing oven equipment for making sectional door panels shown in operative relation to an exemplary foam-cored door panel being fabricated to a configuration according to the present invention.
Figure 17:
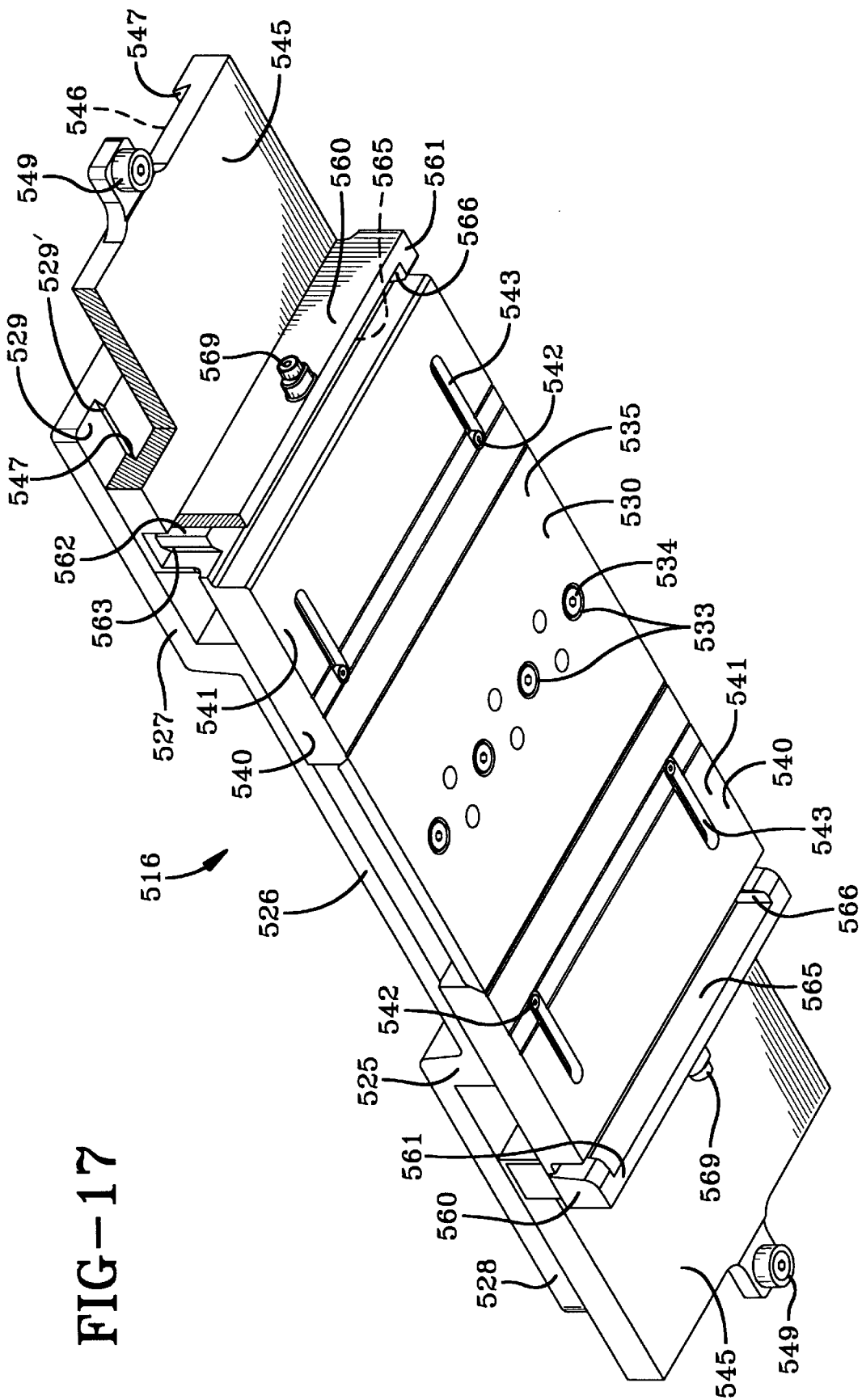
FIG. 17 is a perspective view of a platen of the upper conveyor assembly showing particularly the various plate elements for engaging the inner skin of panel material positioned in the conveyor system of FIG. 16.

Exemplary curing oven equipment in the form of an alternate conveyor system for the manufacture of panels according to the present invention is generally indicated by the numeral 500 in FIGS. 16–25 of the drawings. The conveyor system 500, in the manner of conveyor system 400, permits continuous panel production by effecting pressurized support of a panel, configured such as panel 22 of FIG. 9A, during the expansion and bonding of the internal foam core in an oven, until such time as it becomes substantially set in the final configuration prior to the panel material 22' being cut to length in a manner well-known in the art. The conveyor system 500 includes a lower conveyor assembly, generally indicated by the numeral 501, and an upper conveyor assembly, generally indicated by the numeral 502. The conveyor assemblies 501 and 502 are selectively adjusted, as hereinafter described, to permit the passage of panel material 22' therebetween, as is generally depicted in FIG. 16 of the drawings.

The lower conveyor assembly 501, which is depicted schematically in FIG. 16, is a conventional roller chain conveyor constituting an endless roller chain 505 mounting rectangular pressure platens 506 in a manner well known to persons skilled in the art. The upper run of the lower conveyor assembly 501 thus presents a substantially flat surface 503 adapted to engage the planar outer skin 142 of panel material 22' to resist foaming pressure internally of panel material 22' passing through conveyor system 500 during the manufacturing process. The roller chain 505 is positioned about spaced end roller sprockets 507 and 508. The roller chain 505 may be driven, as indicated in FIG. 16, as by interconnecting the sprocket 508 at the trailing end of the conveyor system 500 with a motor driven sprocket 509 and drive chain 510. The lower conveyor assembly 501 may be supported on conventional frame members F. The lower conveyor assembly 501 is thus constituted as a conventional platen or slab conveyor.

The upper conveyor assembly 502, which is similarly depicted schematically in FIG. 16, is a roller chain conveyor constituting an endless roller chain 515 mounting generally rectangular pressure platens 516 in a manner well known to persons skilled in the art. The lower run of upper conveyor assembly 502 thus presents a generally flat surface, except as hereinafter noted, adapted to engage the inner skin 146 and struts 26 and 27 of panel material 22' to resist foaming pressure internally of a panel material 22' passing through conveyor system 500 during the manufacturing process. The roller chain 515 is positioned about spaced end roller sprockets 517 and 518. The roller chain 515 may be driven, as indicated in FIG. 16, as by interconnecting the sprocket 518 at the trailing end of the conveyor system 500 with a motor driven sprocket 519 and drive chain 520 in the manner employed for lower conveyor assembly 501. The upper conveyor assembly 502 may be supported on conventional frame members F'. Thus, the arrangement of upper conveyor assembly 502 and the drive system therefor is constituted in the same general manner as lower conveyor assembly 501.

In contrast to the conventional rectangular configuration of the pressure platens 506 of the lower conveyor assembly 501, the pressure platens 516 of the upper conveyor assembly 502 are specially configured, as depicted in FIGS. 17–22, to accommodate panel material 22' of different widths and thicknesses (FIGS. 18–20). The pressure platens 516 have a base block 525 which is of a generally rectangular configuration and has conventional mounting elements (not shown) for connection to roller chain 515 of upper conveyor assembly 502. The base block 525 is generally in the shape of a shallow U in cross section, laterally of upper conveyor assembly 502, with a central recessed portion 526 separating spaced wings 527 and 528.

Referring now particularly to FIGS. 17–20, the pressure platen 516 has positioned substantially medially of the lateral extent thereof and medially of the recessed portion 526 a center plate 530. The center plate 530 is suspended from base block 525 as by a plurality of machine screws 531 which may carry springs 532 that bias the center plate 530 toward base block 525 when compressed. The center plate 530 may be provided with a plurality of bores 533, there being four such bores shown in FIG. 17, which receive guide pins 534 extending downwardly from base block 525 to maintain the center plate 530 appropriately positioned for direct vertical motion. As can be best seen in FIGS. 18 and 19, center plate 530 has a lower surface 535 with a dimension laterally of upper conveyor assembly 502 which is substantially the lateral dimension of the medial recess 150 in the inner skin 146 of panel material 22' which, as can be seen in FIGS. 18 and 19, is uniform for all panel sizes.

Positioned laterally of upper conveyor assembly 502 to either side of center plate 530 are side plates 540 which may be structurally identical. The side plates 540 have lower surfaces 541 adapted to engage the inner skin 146 of panel 22. In order to accommodate door panel material 22' of differing widths, which is necessary to provide sectional doors of differing heights, the side plates 540, 540 may be adjustably positioned laterally of upper conveyor assembly 502 by virtue of lateral movement of the side plates 540 to be telescoped within or overlapped by the center plate 530 to different lateral extent, as can be appreciated by comparing the position of the side plates 540, 540 in FIGS. 18 and 19. The side plates 540 may be suspended from base block 525 by a plurality of cap screws 542 which fit in slots 543 in engaging surface 541 to permit the aforedescribed lateral movement of side plates 540.

Extending laterally outwardly of side plates 540 are platen width adjustment plates 545 which support side plates 540 in the area of wings 527, 528 of base block 525. In particular, the underside of side wings 527, 528 have slots 529 which have inward cuts 529' (see FIG. 17) at either side of each of side wings 527, 528. The upper surfaces of width adjustment plates 545 each have a center slot 546 which has undercuts 547 that are adapted to matingly engage the inward cuts 529' to thus form a dovetail fit between the width adjustment plates 545 and the wings 527, 528. The base block 525 thus supports the width adjustment plates 545 for sliding movement relative thereto and to center plates 530.

The side plates 540 are maintained or temporarily locked at one of a plurality of preselected positions laterally of center plate 530 by virtue of width positioning mechanisms, generally indicated by the numeral 550, as seen in FIG. 22. The width positioning mechanisms 550 are interposed between each of the side plates 540 and the upper side of center plate 530. As shown, the upper side of center plates 530 has a projecting spring-loaded detent 551 which lies in proximity to the lower surface of side plates 540. The lower sides of side plates 540 which are overlapped by center plate 530 have an insert 552 having a plurality of laterally spaced depressions 553 which are engaged by the mating spring-loaded detent 551.

While three spaced depressions 553 are shown for exemplary purposes in FIG. 22, it will be appreciated that more or less depressions may be provided, depending upon the number of different widths of panel material 22', to be processed in the conveyor system 500. It will be noted that the depression 553 shown engaged in FIG. 22 produces the narrowest width of panel material 22', as depicted in FIG. 18. In FIG. 19, the widest panel material 22' is depicted in which the spring-loaded detent 551 would repose in the depression 553 at the lateral inner extremity of side plates 540, as seen in FIG. 22. FIG. 20 depicts a lateral positioning of the side plates 540, such that the center plate 530 is retracted by springs 532 on machine screws 531, whereby the lower surfaces 541 of side plates 540 and lower surface 535 of center plate 530 are co-planar. In such instance, the conveyor system 500 is adapted to process panel material 22', as seen in FIG. 20, which is of uniform thickness between the struts 26 and 27 or over the entire width, as shown. It will thus be appreciated that the width positioning mechanism 550 maintains the side plates 540 at any of the selected positions laterally of center plate 530 until a width adjustment is made in a manner hereinafter described.

Positioned laterally outwardly of the lower surfaces 541 of each of side plates 540 is a height adjustment block 560. The height adjustment blocks 560, as seen particularly in FIGS. 17–20, have substantially L-shaped lower and laterally inner surfaces 561 adapted to engage the laterally outer portions of the struts 26, 27 and any inner surface configuration of the panel material 22' located laterally outwardly thereof. In order to accommodate door panel material 22' of differing thicknesses, which is desirable to provide sectional doors of differing insulation values, the height adjustment blocks 560, 560 are mounted for movement substantially perpendicular to the lower surfaces 541 of the side plates 540. The path of the height adjustment blocks 560 and the suspension relative to side plates 540, 540 is accomplished by height adjustment gibs 562 attached to the side plates 540 laterally outwardly of and above the lower surfaces 541 of side plates 540, 540.

The height adjustment gibs 562, 562 have inward cuts 563 at the extremities thereof (see FIG. 7). The laterally inner surface of the height adjustment blocks 560 has vertical center slots 565 which have undercuts 566 that are adapted to matingly engage the inward cuts 563 of height adjustment gibs 562 to thus form a dovetail fit between the height adjustment blocks 560 and the height adjustment gibs 562. The side plates 540 thus support the height adjustment blocks 560 for sliding vertical movement relative thereto.

The height adjustment blocks 560, 560 are maintained at one of a plurality of preselected positions vertically of or perpendicular to side plates 540 by virtue of height positioning mechanism, generally indicated by the numeral 570, as seen particularly in FIG. 21. The height positioning mechanisms 570 are interposed between each of the height adjustment blocks 560 and the height adjustment gibs 562. As shown, the laterally outer surface of height adjustment gibs 562 has a projecting spring-loaded detent 571 which lies in proximity to the center slots 565 in the height adjustment blocks 560. The center slots 565 of height adjustment blocks 560 have a plurality of spaced depressions 573 which are engaged by the mating spring-loaded detent 571. While three spaced depressions 573 are shown for exemplary purposes in FIG. 21, it will be appreciated that more or less depressions may be provided, depending upon the number of different thicknesses of panel material 22' to be processed in the conveyor system 500. It will be noted that the depression 573 shown engaged in FIG. 21 produces the thinnest panel material 22', as depicted in FIG. 18. In FIG. 19, the thickest panel material 22' is depicted in which the spring-loaded detent 571 would repose in the depression 573 closest to the upper vertical extremity of the height adjustment block 560, as seen in FIG. 21. It will thus be appreciated that the height positioning mechanism 570 maintains the height adjustment blocks 560, 560 at any of the selected positions vertically of the side plates 540, 540 until a height adjustment is made in a manner hereinafter described.

Figure 23:
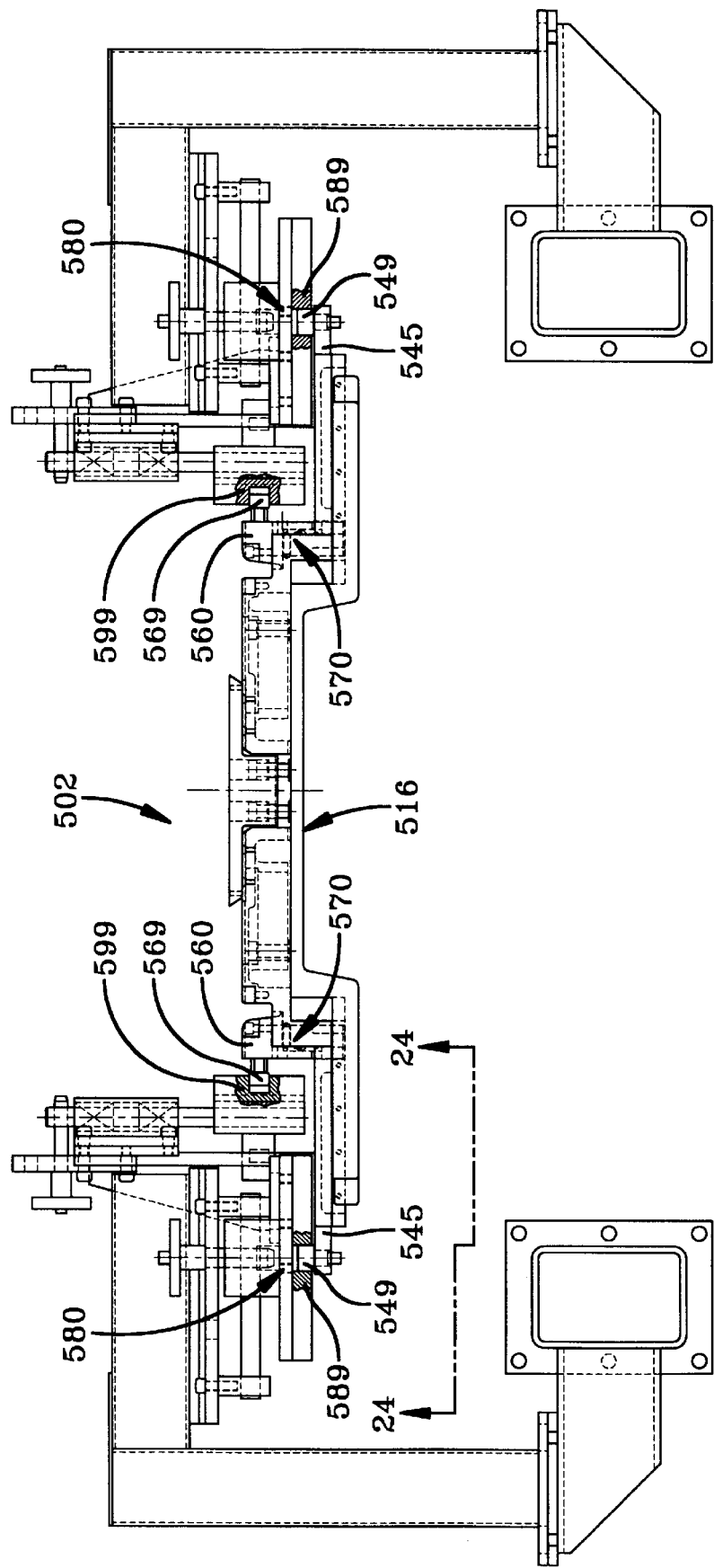
FIG. 23 is a fragmentary elevational view taken substantially along the line 23—23 of FIG. 16 showing the height-adjusting mechanisms and the width-adjusting mechanisms for the platens of the upper conveyor system.

The side plates 540, 540 are moved between the plurality of preselected positions laterally of center plate 530 established by width positioning mechanism 550 by a width adjusting mechanism, generally indicated by the numeral 580 in FIGS. 16, 23, and 24. As best seen in FIG. 16, the width adjusting mechanism 580 is positioned on the upper run of the upper conveyor assembly 502. As seen in FIG. 23, a width adjusting mechanism 580 is positioned to either side of upper conveyor assembly 502 in operative relationship to the width adjustment plates 545, 545 of the platens 516. Each width adjusting mechanism 580 has a fixed mounting plate 581 which may be mounted to a portion of the frame F of the conveyor assembly 500, preferably at a pair of spaced locations, as seen in FIG. 24. Each fixed mounting plate 581 carries a width adjusting plate 582 which is mounted for movement laterally of the upper conveyor assembly 502. Width adjusting plate 582 is supported for movement relative to fixed mounting plate 581 by a plurality of spaced guide rods 583. The guide rods 583 are each supported by a pair of spaced rod hangers 584 attached to the fixed mounting plate 581. The guide rods 583 also pass through and are supported by bearing blocks 585 attached to the width adjusting plate 582.

The width adjusting plate 582 is moved relative to the fixed mounting plate 581 on guide rods 583 by means of a width adjusting screw 586 which is supported on the fixed mounting plate 581 by a screw block 587 and on the width adjusting plate 582 by a screw support block 588. It will be appreciated that actuation of the screw 586 will effect lateral movement of the width adjusting plate 582 relative to the fixed mounting plate 581, as controlled by the guide rods 583. The width adjusting plate 582 has a cam track 589 which has a converging portion 589' and a parallel portion 589". The width adjusting plates 582 carry, preferably proximate the lateral extremities thereof, cam rollers 549 which each engage cam track 589.

When the upper conveyor assembly 502 is operating at a preselected position of the width positioning mechanism 550, the cam rollers 549 engage only the parallel portion 589" of the cam track 589. When it is desired to run a different width of panel material 22', the upper conveyor assembly 502 is stopped, and the width adjusting screw 586 is actuated to move the width adjusting plate 582 and thus cam track 589 laterally inwardly or outwardly to the desired preselected position of width positioning mechanism 550. Upon actuation of the upper conveyor assembly 502, the cam rollers 549 on the platens 516 are guided to the new lateral position established by the parallel portions 589" of cam track 589 by the converging portions 589' of cam track 589. It will be appreciated that operation of the upper conveyor assembly 502 through one complete revolution will adjust the side plates 540 of all platens 516 to a new lateral width which will be maintained by the width positioning mechanism 550 until such time as it is desired to convert to a different width of panel material 22'.

The height adjustment blocks 560, 560 are moved between the plurality of preselected positions vertically of the side plates 540, 540 established by height positioning mechanism 570 by a height adjustment mechanism, generally indicated by the numeral 590 in FIGS. 16, 23, and 25. As best seen in FIG. 16, the height adjustment mechanism 590 is positioned on the upper run of upper conveyor assembly 502 at a location which may be proximate to the width adjusting mechanism 580. As seen in FIG. 23, a height adjustment mechanism 590 is positioned to either side of upper conveyor assembly 502 in operative relationship to height adjustment blocks 560, 560 of the platens 516. Each height adjustment mechanism 590 has a fixed mounting plate 591 which may be mounted to a portion of the frame of the conveyor assembly 500. Each fixed mounting plate 591 carries a height adjusting plate 592 which is mounted for movement vertically of the upper conveyor assembly 502. Height adjusting plate 592 is supported for movement relative to fixed mounting plate 591 by a plurality of spaced guide rods 593. The guide rods 593 are each supported by a rod mounting block 594 attached to the height adjusting plate 592. The guide rods 593 also pass through and are supported by bearing blocks 595 attached to the fixed mounting plate 591.

The height adjusting plate 592 is moved relative to the fixed mounting plate 591 on the guide rods 593 by means of a height adjusting screw 596 which is supported on the fixed mounting plate 591 by a screw block 597 and on the height adjusting plate 592 by a screw support block 598. It will be appreciated that actuation of the height adjusting screw 596 will effect movement vertically of upper conveyor assembly 502 of the height adjusting plate 592 relative to the fixed mounting plate 591, as controlled by the guide rods 593.

When the upper conveyor assembly 502 is operating at a preselected position of the height positioning mechanism 570, 570, the cam followers 569 engage only parallel portion 599" of cam track 599. When it is desired to run a different width of panel material 22', the upper conveyor assembly 502 is stopped, and the height adjusting screw 596 is actuated to move the height adjusting plate 592 and thus cam track 599 vertically upwardly or downwardly to the desired preselected position of height adjustment blocks 560, 560. Upon actuation of the upper conveyor assembly 502, cam followers 569, and thus the height adjustment blocks 560 are guided to the new vertical position or height established by the parallel portions 599" of cam track 599 by converging portions 599' of cam track 599. It will be appreciated that operation of the upper conveyor assembly 502 through one complete revolution will adjust the height adjustment blocks 560, 560 to a new vertical height which will be maintained by the height positioning mechanisms 570, 570 until such time as it is desired to convert to a different height of panel material 22'.

Thus, it should be evident that the sectional overhead door and apparatus for making door panels disclosed herein carries out various of the objects of the present invention set forth above and otherwise constitutes an advantageous contribution to the art. As will be apparent to persons skilled in the art, modifications can be made to the preferred embodiments disclosed herein without departing from the spirit of the invention, the scope of the invention being limited solely by the scope of the attached claims.

We claim:

1. Conveyor apparatus for the continuous production of foam-cored door panel material having a planar skin on one side and a skin on the other side thereof having a pair of spaced co-planar skin surfaces joined by an offset skin surface comprising, first conveyor means having a first panel-engaging surface lying in a plane for engaging the planar skin on one side of the panel material, means for driving said first conveyor means at a selected speed, second conveyor means having second and third panel-engaging surfaces for engaging the spaced skin surfaces and the offset skin surface, respectively, on the other side of the panel material, said second conveyor means being an endless platen conveyor, and means for driving of said second and third panel-engaging surfaces of said second conveyor means at substantially the same speed as said selected speed of said first conveyor means.

2. Conveyor apparatus for the continuous production of foam-cored door panel material having a first side and a second side comprising, a first conveyor engaging the first side of the panel material, a second conveyor engaging the second side of the panel material, a plurality of platen means interconnected to define a continuous surface in said second conveyor, center plate means of said platen means having a first surface projecting a first distance toward said first conveyor for engaging a portion of the second side of the panel material, side plate means permanently movably attached to said platen means and having a second surface projecting a second distance toward said first conveyor for engaging other portions of the second side of the panel material, and means for driving said first conveyor and said second conveyor.

3. Conveyor apparatus according to claim 2, wherein said side plate means are mounted in selectively adjustable overlapping positions relative to said center plate means.

4. Conveyor apparatus according to claim 3 further comprising, width positioning means for maintaining said side plate means at preselected positions laterally of said center plate means for producing panel material of different lateral extent.

5. Conveyor apparatus according to claim 2, wherein said platen means include a base block with said center plate means suspended from and biased toward said base block and said side plate means supported by said base block for movement laterally of said second conveyor relative to said center plate means.

6. Conveyor apparatus according to claim 2, wherein said side plate means includes a pair of plates, one positioned laterally to either side of said center plate means.

7. Conveyor apparatus according to claim 2 further comprising, height adjustment block means operatively interrelated with said side plate means for engaging a portion of the second side of the panel material laterally outwardly of said second surface of said side plate means.

8. Conveyor apparatus for the continuous production of foam-cored door panel material having a first side and a second side comprising, a first conveyor engaging the first side of the panel material, a second conveyor engaging the second side of the panel material, a plurality of platen means interconnected to define a continuous surface in said second conveyor, center plate means of said platen means having a first surface projecting a first distance toward said first conveyor for engaging a portion of the second side of the panel material, side plate means of said platen means overlapping said center plate means and having a second surface projecting a second distance toward said first conveyor for engaging other portions of the second side of the panel material, width positioning means for maintaining said side plate means at preselected positions laterally of said center plate means for producing panel material of different lateral extent, and means for driving said first conveyor and said second conveyor, said width positioning means including detent means on said side plate means for engagement with any one of a plurality of depressions in said center plate means.

9. Conveyor apparatus for the continuous production of foam-cored door panel material having a first side and a second side comprising, a first conveyor engaging the first side of the panel material, a second conveyor engaging the second side of the panel material, a plurality of platen means interconnected to define a continuous surface in said second conveyor, center plate means of said platen means having a first surface projecting a first distance toward said first conveyor for engaging a portion of the second side of the panel material, side plate means of said platen means overlapping said center plate means and having a second surface protecting a second distance toward said first conveyor for engaging other portions of the second side of the panel material, width positioning means for maintaining said side plate means at preselected positions laterally of said center plate means for producing panel material of different lateral extent, width adjusting means for moving said side plate means between said preselected positions maintained by said width positioning means, and means for driving said first conveyor and said second conveyor.

10. Conveyor apparatus according to claim 9, wherein said width adjusting means includes an adjusting plate supported on guide rods from a fixed mounting plate for movement by an adjusting screw, said adjusting plate carrying a cam track thereon, and cam means associated with said side plate means for engaging said cam track to move said side plate means when said adjusting plate is moved by said adjusting screw.

11. Conveyor apparatus for the continuous production of foam-cored door panel material having a first side and a second side comprising, a first conveyor engaging the first side of the panel material a second conveyor engaging the second side of the panel material, a plurality of platen means interconnected to define a continuous surface in said second conveyor, center plate means of said platen means having a first surface projecting a first distance toward said first conveyor for engaging a portion of the second side of the panel material, side plate means of said platen means having a second surface projecting a second distance toward said first conveyor for engaging other portions of the second side of the panel material, height adjustment block means for engaging a portion of the second side of the panel material laterally outwardly of said second surface of said side plate means, and means for driving said first conveyor and said second conveyor, said height adjustment block means being suspended from said side plate means for movement substantially perpendicular to said second surface of said side plate means.

12. Conveyor apparatus for the continuous production of foam-cored door panel material having a first side and a second side comprising, a first conveyor engaging the first side of the panel material, a second conveyor engaging the second side of the panel material, a plurality of platen means interconnected to define a continuous surface in said second conveyor, center plate means of said platen means having a first surface projecting a first distance toward said first conveyor for engaging a portion of the second side of the panel material, side plate means of said platen means having a second surface projecting a second distance toward said first conveyor for engaging other portions of the second side of the panel material, height adjustment block means for engaging a portion of the second side of the panel material laterally outwardly of said second surface of said side plate means, height positioning means for maintaining said height adjustment block means at preselected positions perpendicular to said side plate means for producing panel material of different thicknesses, and means for driving said first conveyor and said second conveyor.

13. Conveyor apparatus according to claim 12, wherein said height positioning means includes detent means on a height adjustment gib attached to said side plate means for engagement with any one of a plurality of depressions in said height adjustment block means.

14. Conveyor apparatus according to claim 12 further comprising, height adjusting means for moving said height adjustment block means between said preselected positions maintained by said height positioning means.

15. Conveyor apparatus according to claim 14, wherein said height adjusting means includes an adjusting plate supported on guide rods from a fixed mounting plate for movement by an adjusting screw, said adjusting plate carrying a cam track thereon, and cam means associated with said height adjustment block means for engaging said cam track to move said height adjustment block means when said adjusting plate is moved by said adjusting screw.

16. Conveyor apparatus for the continuous production of foam-cored door panel material having a first side and a second side comprising, a first conveyor engaging the first side of the panel material, a second conveyor engaging the second side of the panel material, a plurality of platens interconnected to define a continuous surface in said second conveyor, center plates of said platens having a first surface projecting a first distance toward said first conveyor for engaging a portion of the second side of the panel material, side plates of said platens having a second surface projecting a second distance toward said first conveyor for engaging other portions of the second side of the panel material, a first conveyor drive assembly for moving said first conveyor, and a second conveyor drive assembly for moving said second conveyor.

17. Conveyor apparatus according to claim 16, wherein said side plates are mounted for movement laterally of said center plates.

18. Conveyor apparatus according to claim 16 further comprising, height adjustment blocks suspended from said side plates and laterally outwardly of said second surface of said side plates for engaging a portion of the second side of the panel material.

19. Conveyor apparatus for the continuous production of foam-cored door panel material having a first side and a second side comprising, a first conveyor engaging the first side of the panel material, a first conveyor drive assembly for moving said first conveyor at a selected speed, a second conveyor engaging the second side of the panel material, a plurality of platens interconnected to define a continuous surface in said second conveyor, center plates of said platens having a first surface projecting a first distance toward said first conveyor for engaging a portion of the second side of the panel material, side plates of said platens having a second surface projecting a second distance toward said first conveyor for engaging other portions of the second side of the panel material, and a second conveyor drive assembly for moving said second conveyor independent of said first conveyor.

20. Conveyor apparatus according to claim 19, wherein said side plates are mounted in selectively adjustable overlapping positions relative to said center plates.

21. Conveyor apparatus according to claim 19, wherein said platens include base blocks with said center plates suspended from said base blocks and said side plates supported by said base blocks for movement laterally of said second conveyor relative to said center plate.

22. Conveyor apparatus according to claim 19 further comprising, width adjusting mechanisms for maintaining said side plates at preselected positions laterally ofsaid center plates for producing panel material of different lateral extent.

23. Conveyor apparatus according to claim 22 further comprising, width adjusting plates for moving said side plates between said preselected positions.

24. Conveyor apparatus according to claim 19 further comprising, height adjustment blocks operatively interrelated with said side plates for engaging a portion of the second side of the panel material.

25. Conveyor apparatus according to claim 24 further comprising, height adjustment plates for moving said height adjustment blocks between preselected positions.

* * * * *

UNITED STATES PATENT AND TRADEMARK OFFICE
CERTIFICATE OF CORRECTION

PATENT NO. : 6,019,269
DATED : February 1, 2000
INVENTOR(S) : Willis J. Mullet, Albert W. Mitchell and Thomas B. Bennett, III It is certified that error appears in the above-identified patent and that said Letters Patent is hereby corrected as shown below:

Column 27,
Line 12, the word "protecting", should be -- projecting --;
Line 31, between the word "material" and "a", a comma should be inserted.

Column 28,
Line 65, betweeen the word "ofsaid" should have a space inserted to make it appear as -- of said --.

Signed and Sealed this

Fifth Day of October, 2004

JON W. DUDAS
*Director of the United States Patent and Trademark Office*